United States Patent
Wong et al.

(10) Patent No.: US 9,436,849 B2
(45) Date of Patent: Sep. 6, 2016

(54) SYSTEMS AND METHODS FOR TRADING OF TEXT BASED DATA REPRESENTATION

(71) Applicants: Sze Yuen Wong, Herndon, VA (US); Wai Pong Leung, Clarksburg, MD (US)

(72) Inventors: Sze Yuen Wong, Herndon, VA (US); Wai Pong Leung, Clarksburg, MD (US)

(*) Notice: Subject to any disclaimer, the term of this patent is extended or adjusted under 35 U.S.C. 154(b) by 0 days.

(21) Appl. No.: 14/549,838

(22) Filed: Nov. 21, 2014

(65) Prior Publication Data
US 2016/0148021 A1    May 26, 2016

(51) Int. Cl.
| | | |
|---|---|---|
| G06F 11/30 | (2006.01) | |
| G06F 21/78 | (2013.01) | |
| G06F 21/60 | (2013.01) | |
| G06F 21/62 | (2013.01) | |

(52) U.S. Cl.
CPC ............ G06F 21/78 (2013.01); G06F 21/602 (2013.01); G06F 21/6218 (2013.01); G06F 21/6227 (2013.01)

(58) Field of Classification Search
CPC ............... G06F 21/6209; G06F 21/78; G06F 21/6227; G06F 21/602; G06F 21/6218; H04L 2209/88; H04L 9/0836; H04L 9/3073
USPC ......................................... 713/193; 380/284
See application file for complete search history.

(56) References Cited

U.S. PATENT DOCUMENTS

| | | | | |
|---|---|---|---|---|
| 2010/0054481 A1* | 3/2010 | Jajodia | .................. | H04L 9/0897 380/284 |
| 2013/0318347 A1* | 11/2013 | Moffat | .................... | H04L 63/08 713/168 |

* cited by examiner

*Primary Examiner* — Morshed Mehedi
*Assistant Examiner* — Abiy Getachew

(57) ABSTRACT

A method for sharing encrypted data and encryption keys through a system comprised of the following data types, but not limited to a; 1) Record and its encryption key, 2) RecordSet and its encryption key, and 3) Entity and its encryption key. A Record is encrypted using an encryption key, furthermore, the Record encryption key is encrypted using a RecordSet encryption key, and finally, both the encrypted Record and its encrypted encryption key are wrapped as a single unit, to avoid key the expensive operations of key lookup and general key operation overhead. Access control to the RecordSet encryption keys are provided by a combination of data types, but not limited to a; 1) Entity and its encryption key, 2) Ciphers, and 3) Trusted Entity Lists. For each Entity which is authorized access to access a RecordSet, an encrypted Cipher, made of both the Entity encryption key and RecordSet encryption key, is added to a Trusted Entity List. Tokens are protected by user defined secrets, comprised of Entity encryption keys.

9 Claims, 37 Drawing Sheets illustrates a Record Diagram

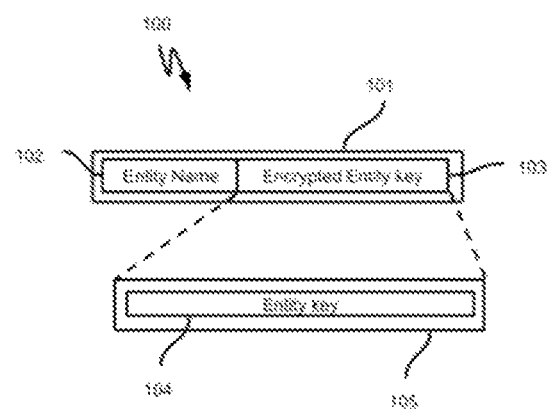
Fig. 1 illustrates an Entity Diagram

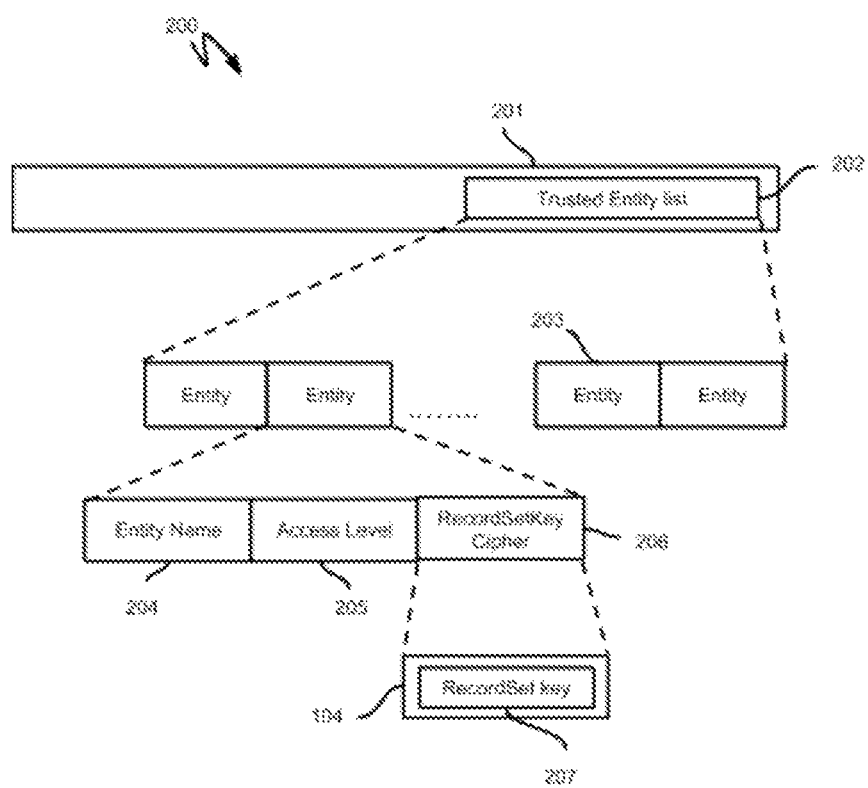
Fig. 2 illustrates a Recordset Diagram

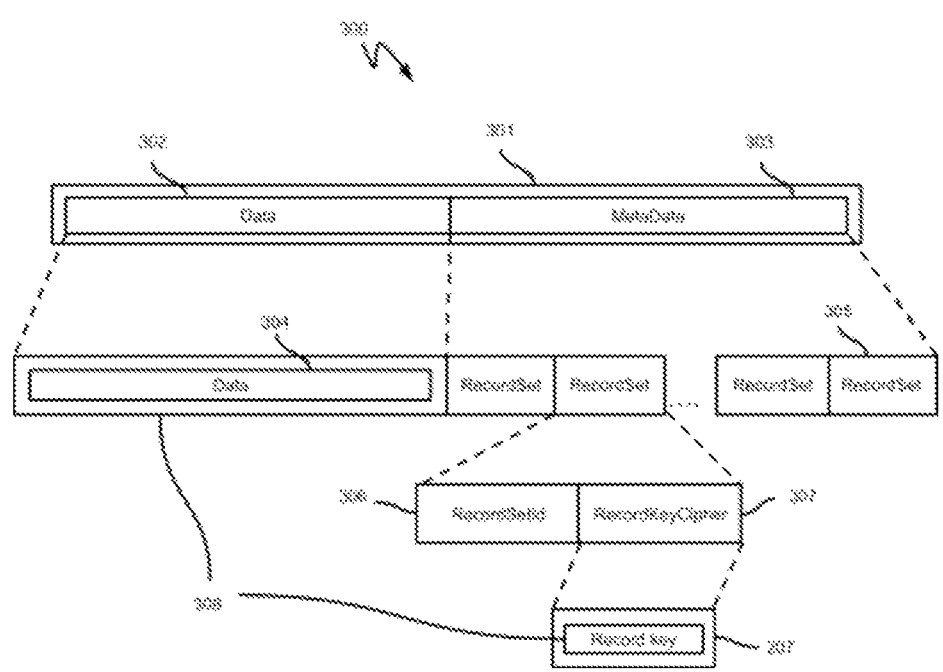
Fig. 3 illustrates a Record Diagram

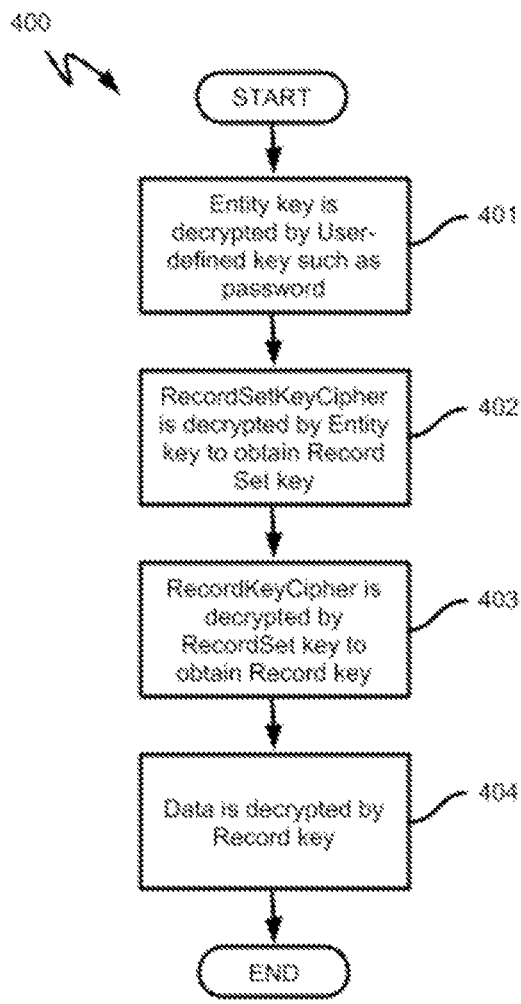
Fig.4a illustrates Data Decryption Flow Diagram

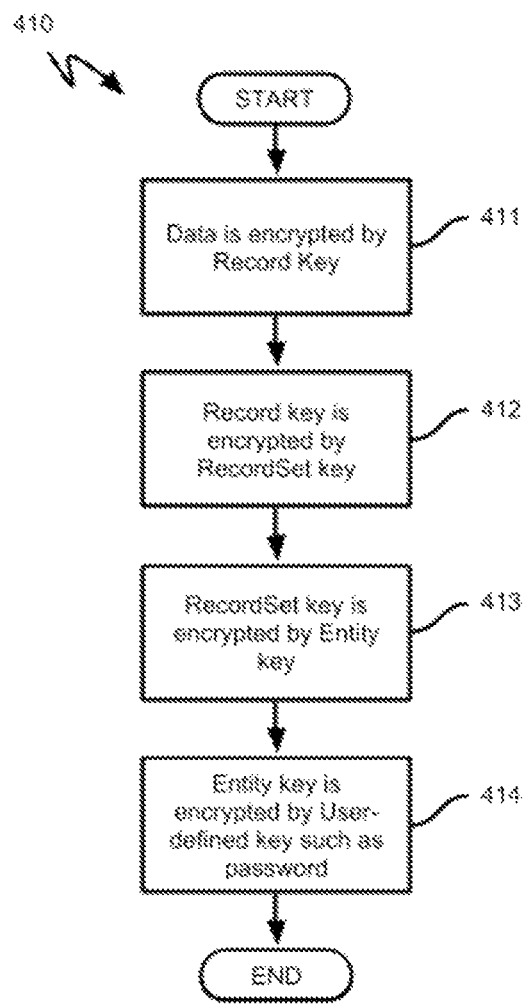
Fig. 4b illustrates Data Encryption Flow Diagram

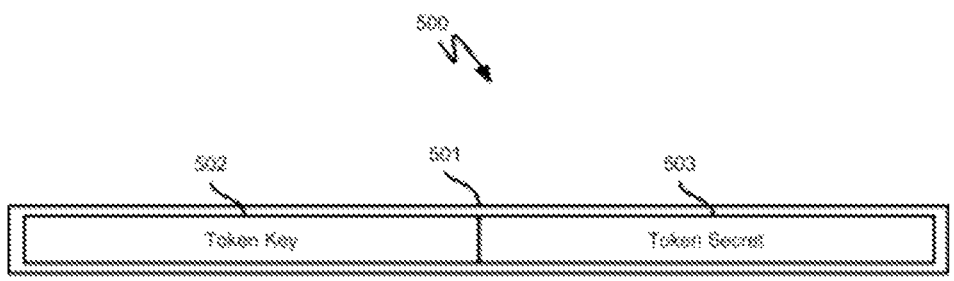
Fig. 5a illustrates a Sharing Token Data Structure

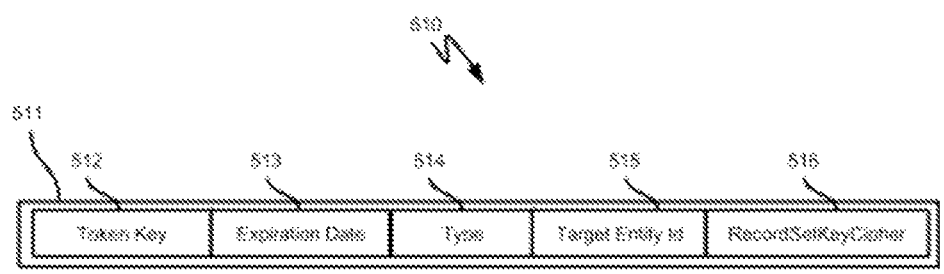
Fig. 5b illustrates a Sharing Token Record Data Structure

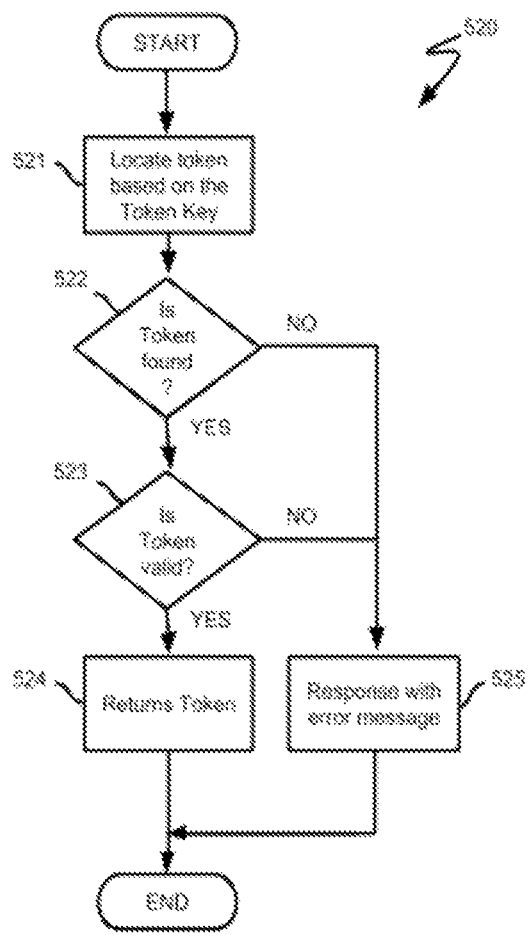
Fig. 5c illustrates a Sharing Token Validation Workflow Diagram

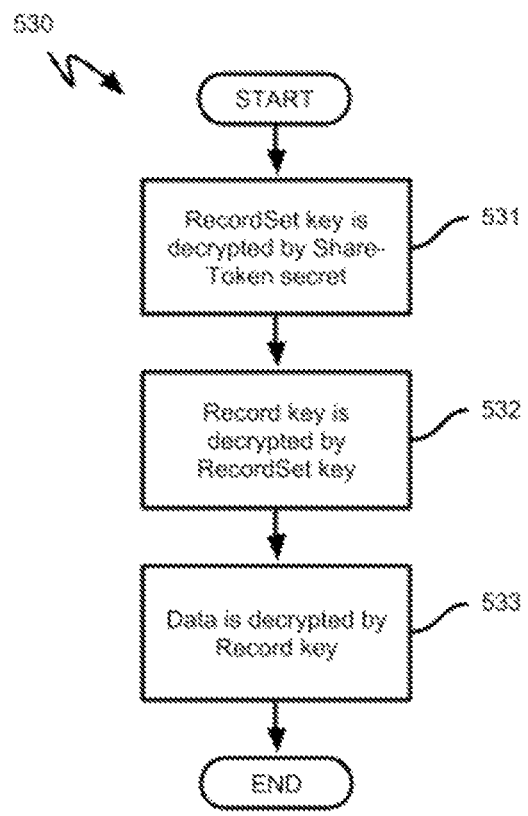
Fig. 5d illustrates Data Decryption Flow using Share-Token Diagram

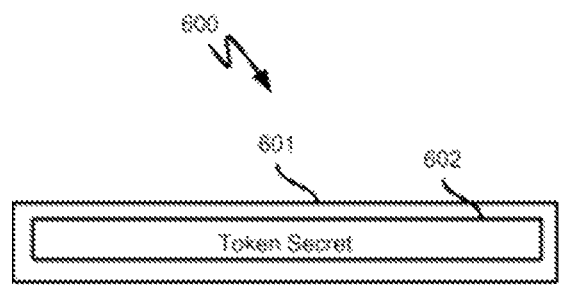
Fig. 6a illustrates a Export Token Data Structure

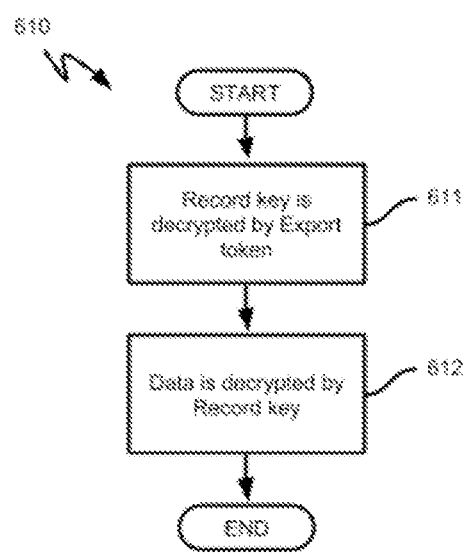
Fig. 6b illustrates Data Decryption Flow using Export Token Diagram

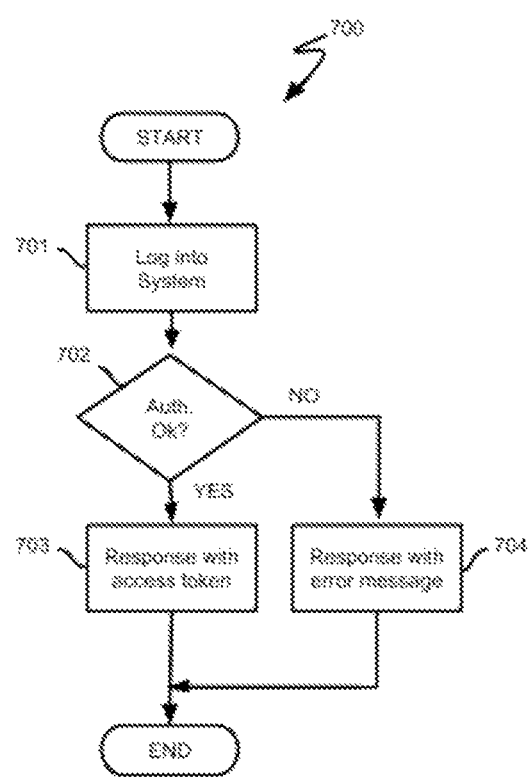
Fig. 7 illustrates a Login Flow Diagram

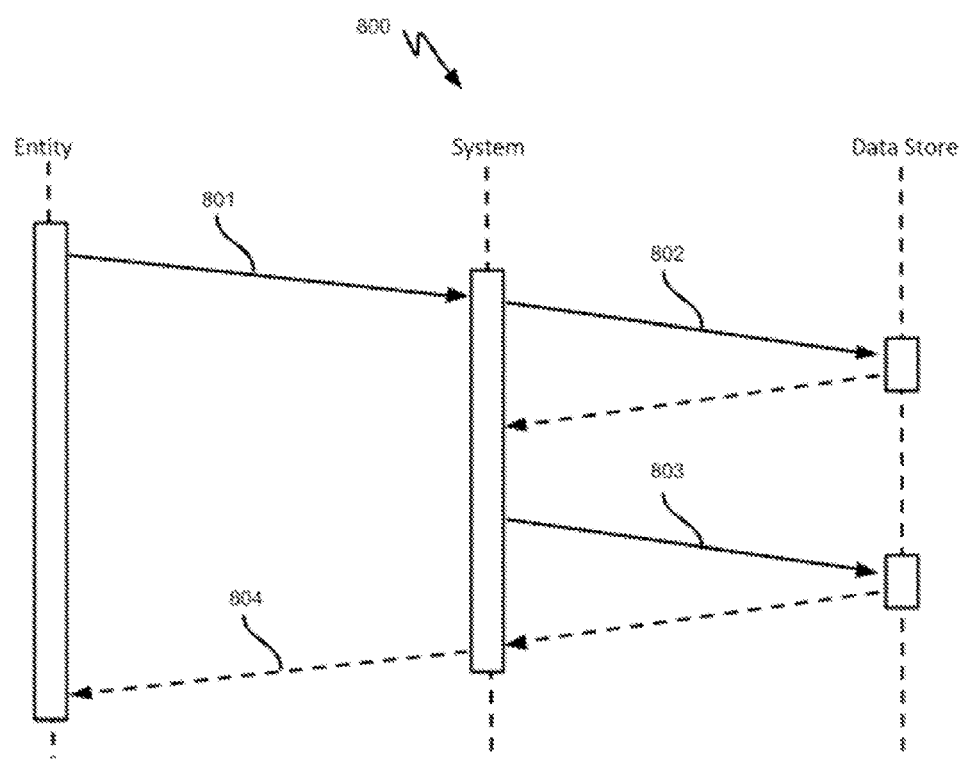
Fig. 8 illustrates a Saving New Record Flow Diagram

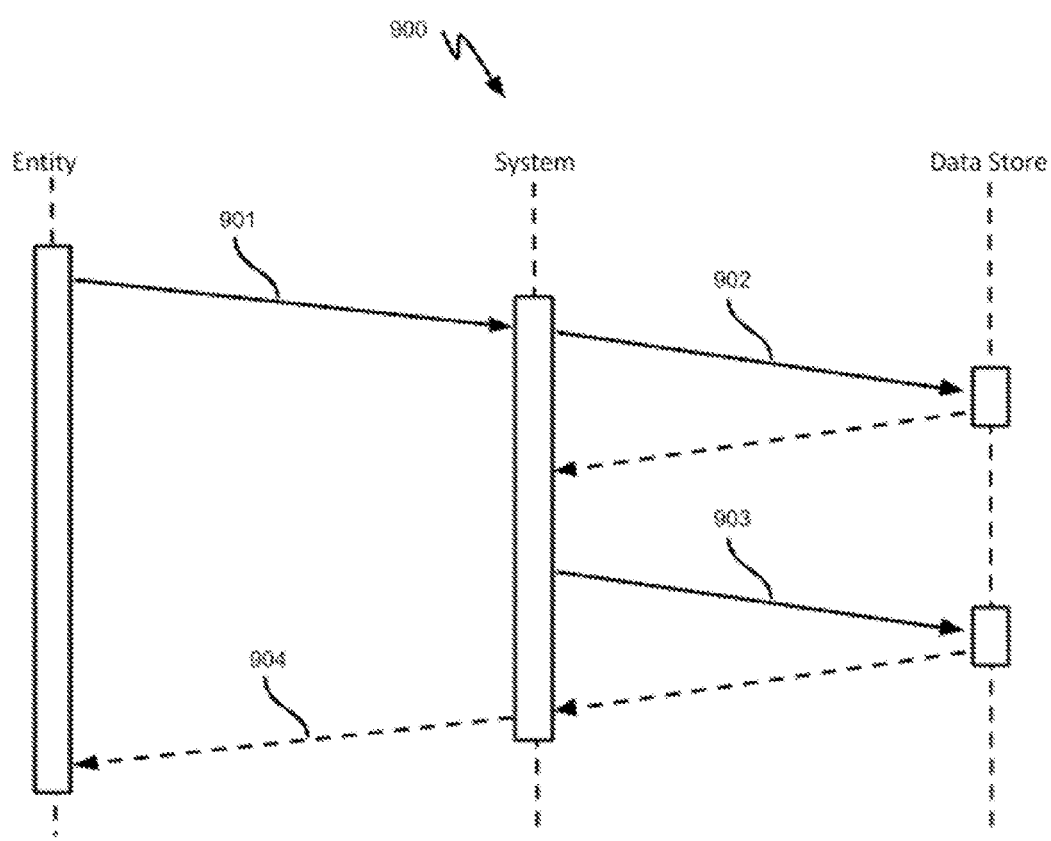
Fig. 9 illustrates a Reading Record Flow Diagram

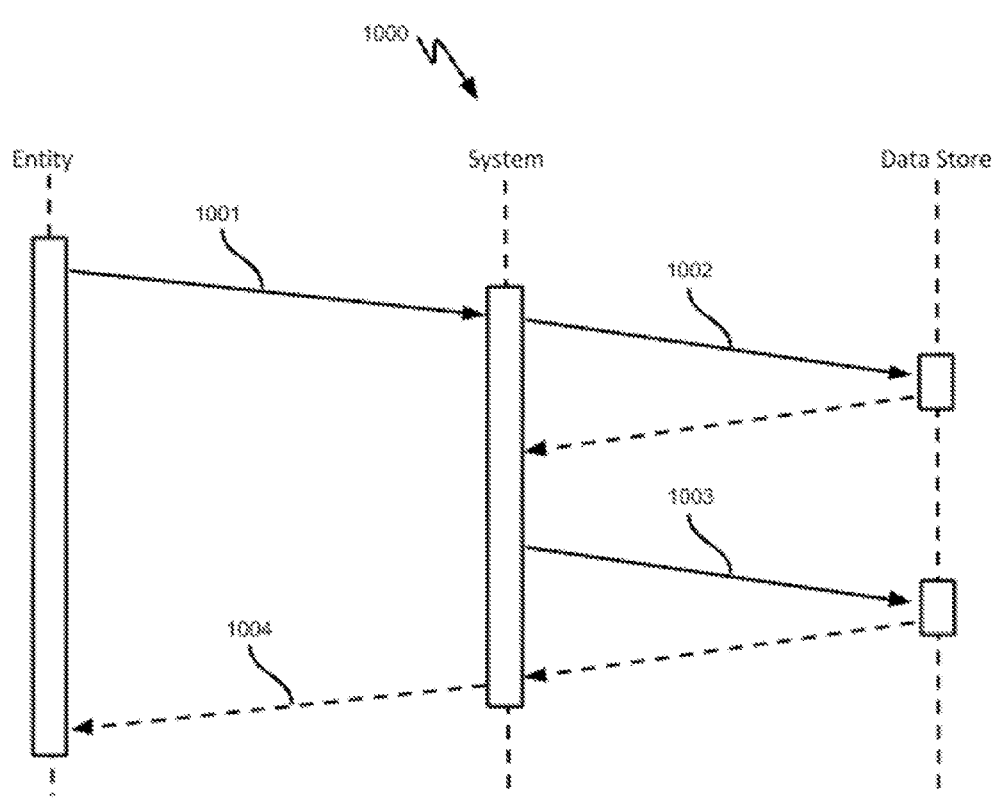
Fig. 10 illustrates a Reading Query Flow Diagram

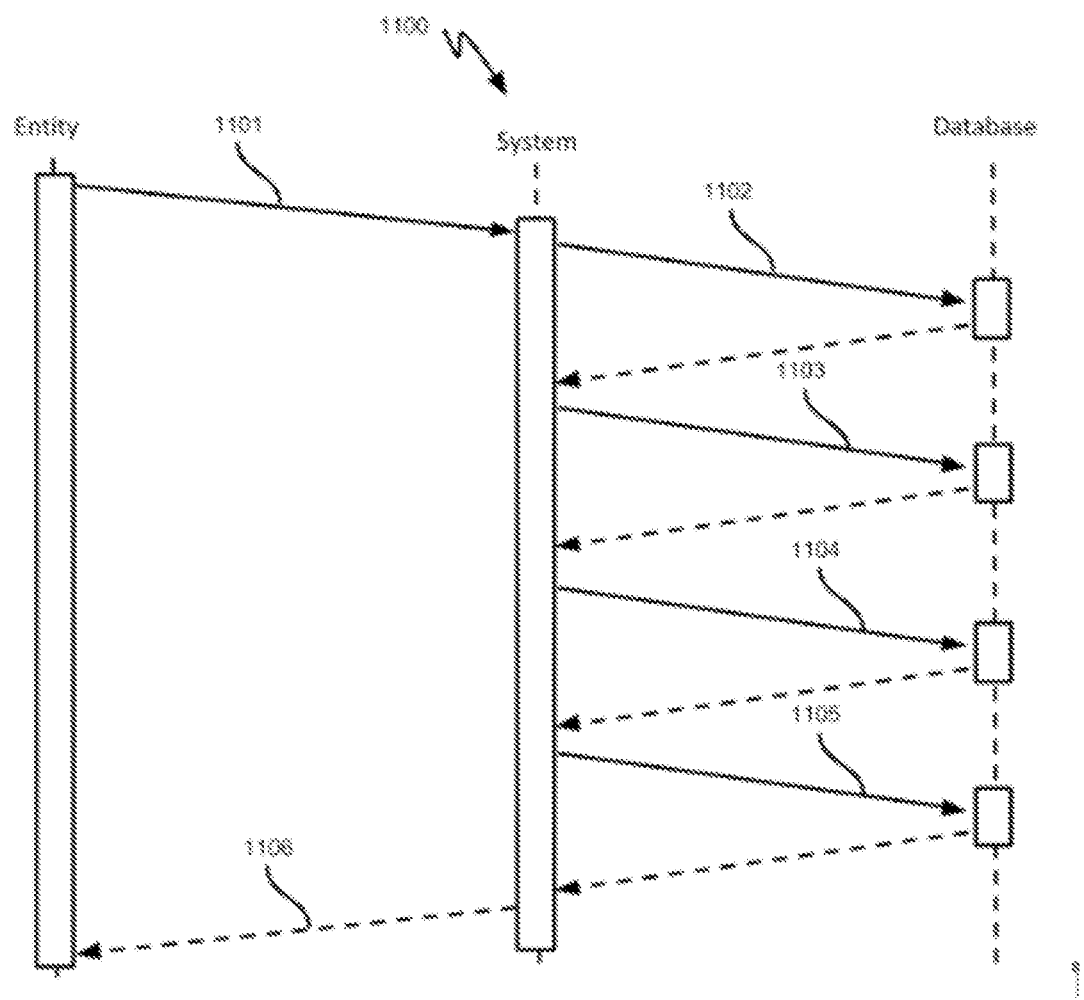
Fig. 11 illustrates a Regrouping Flow Diagram

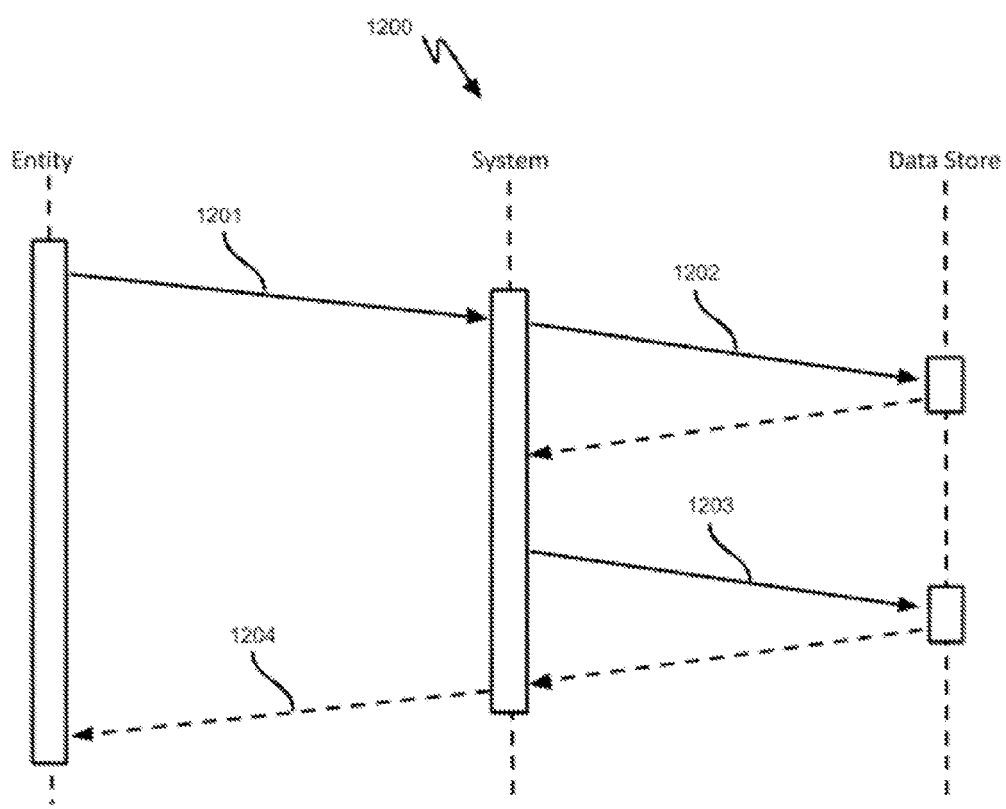
Fig. 12a illustrates a Sharing Creation Flow Diagram

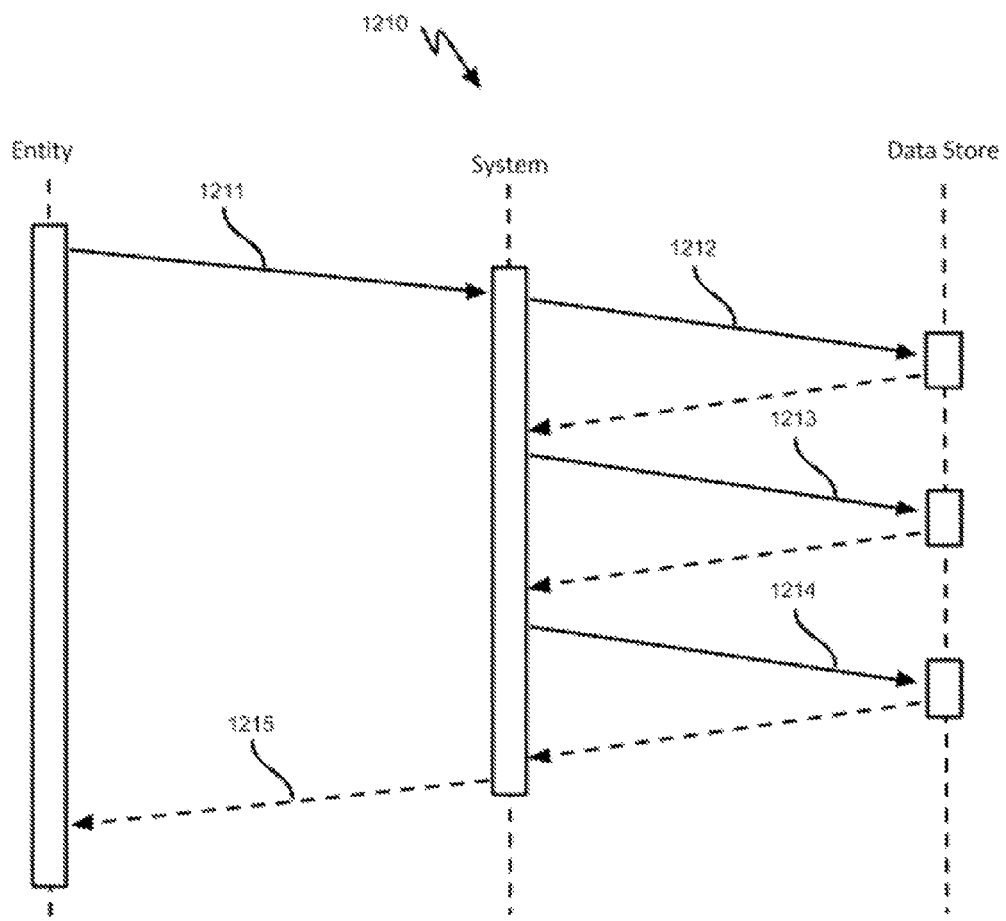
Fig. 12b illustrates a Token-Sharing Flow Diagram

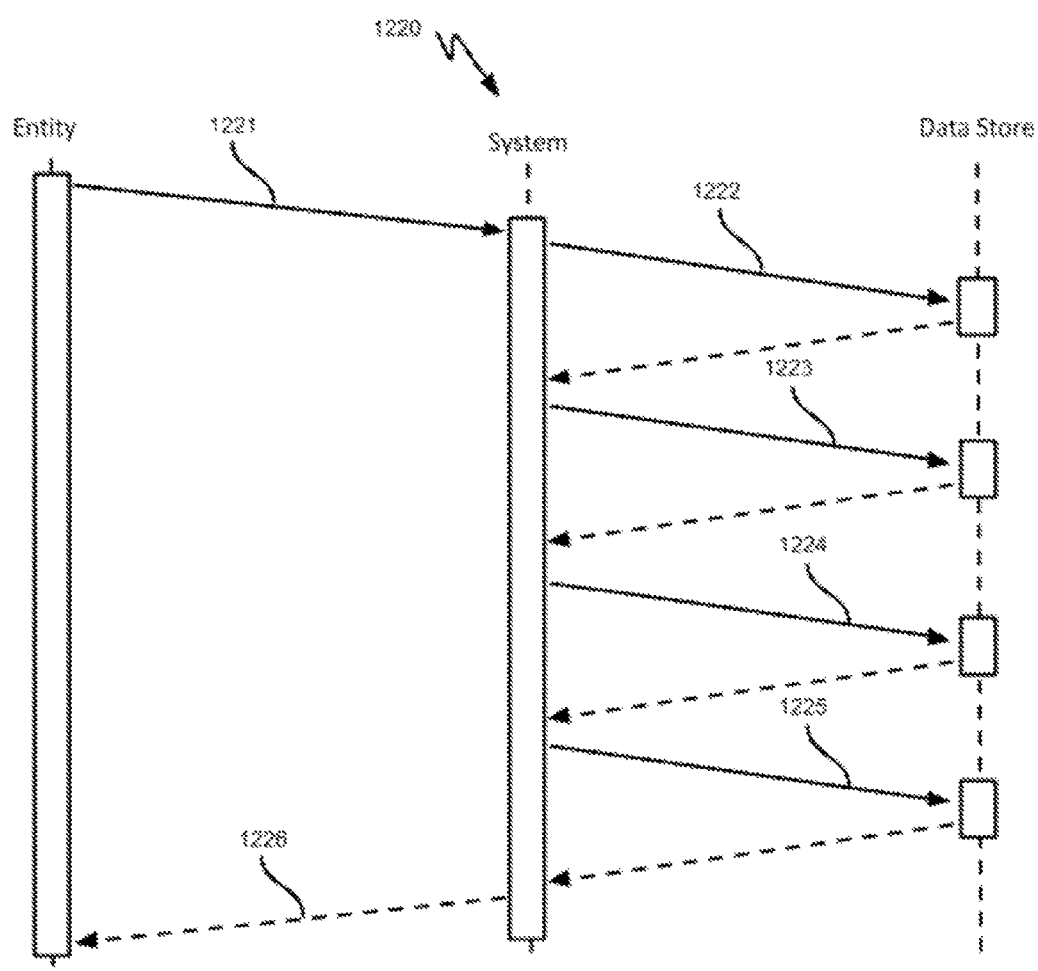
Fig. 12c illustrates an Entity-Sharing Flow Diagram

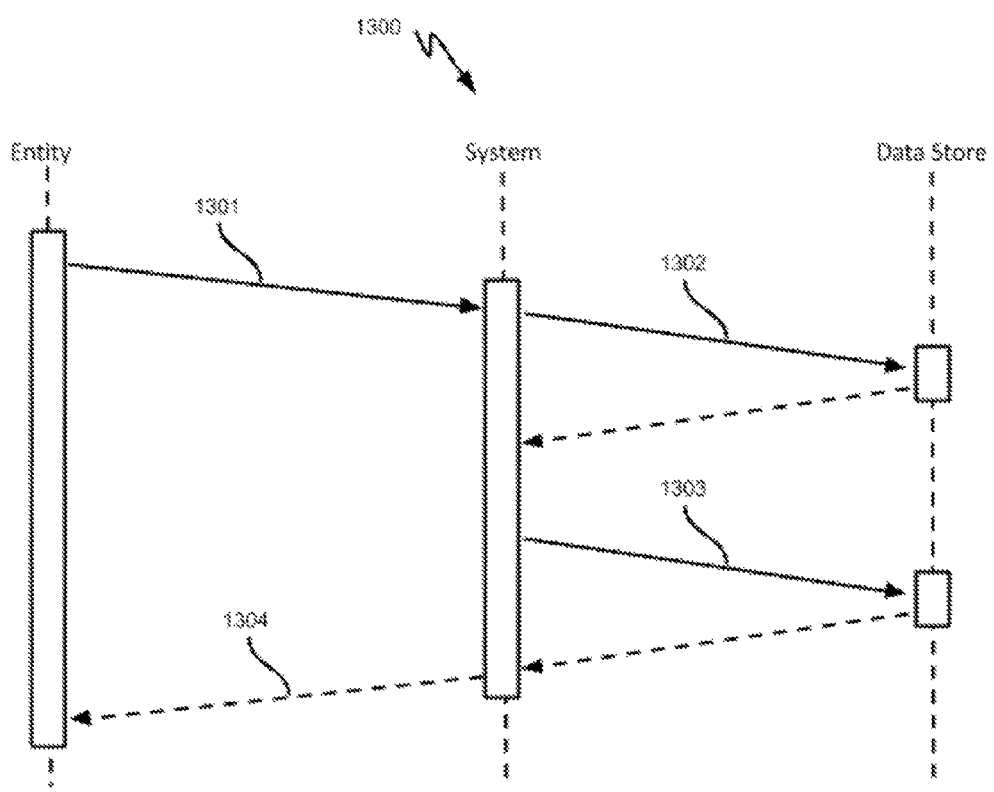
Fig. 13 illustrates a Assignment Flow Diagram

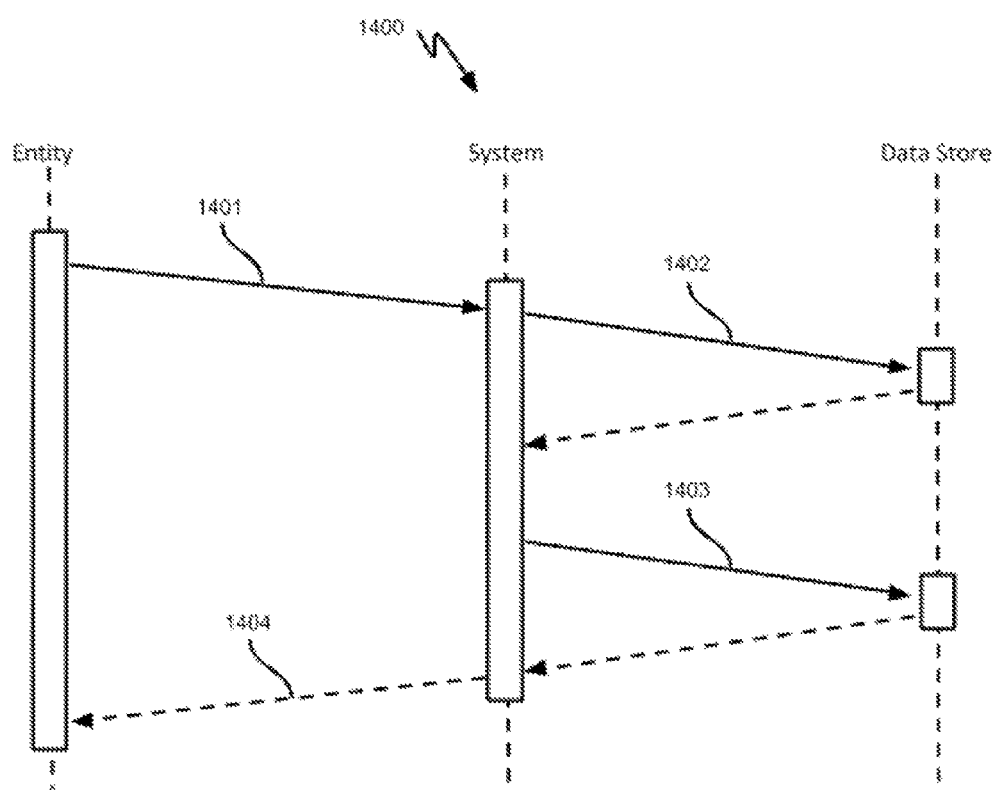
Fig. 14 illustrates a Export Flow Diagram

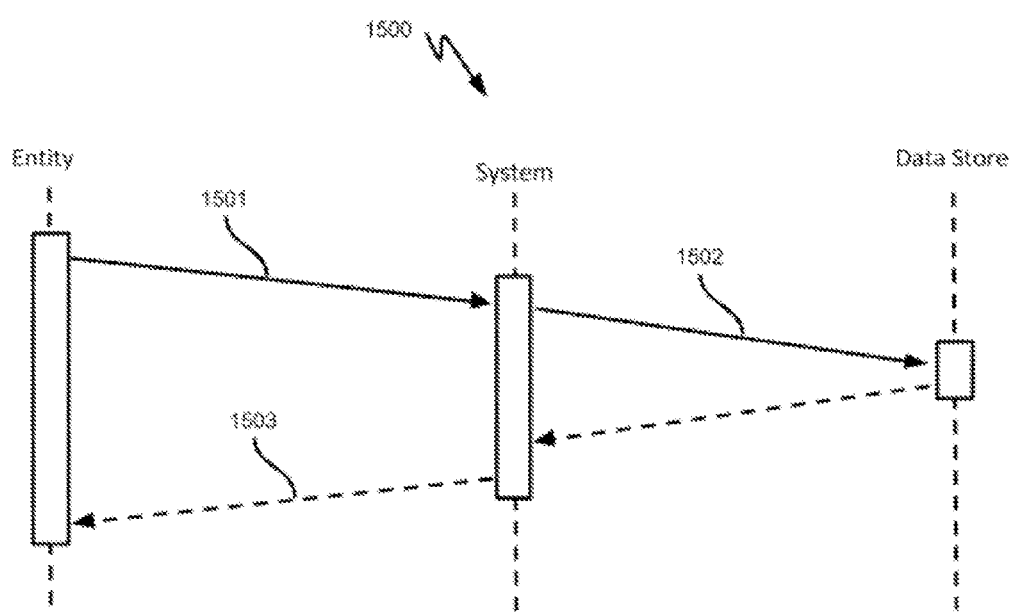
Fig. 15 illustrates a Import Flow Diagram

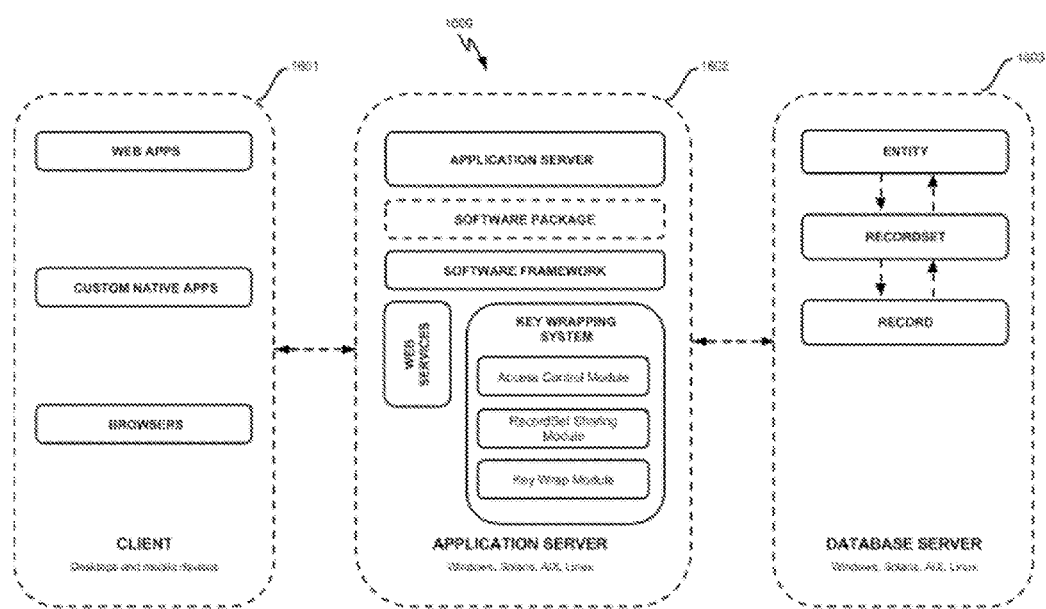
Fig. 16 illustrates an Overall System Architecture Diagram

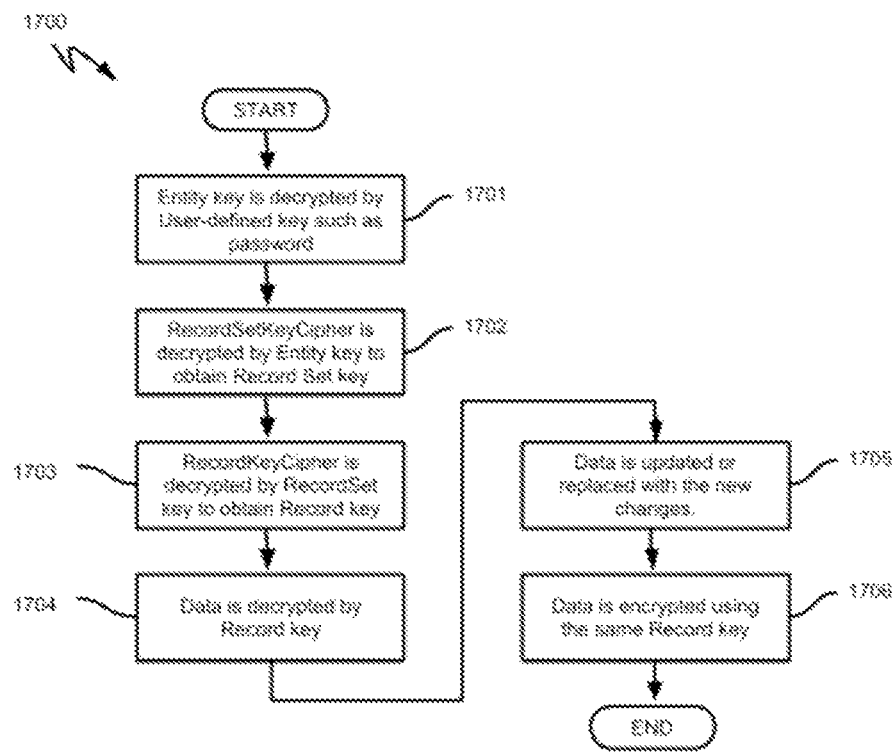
Fig. 17 illustrates a Data Update Diagram

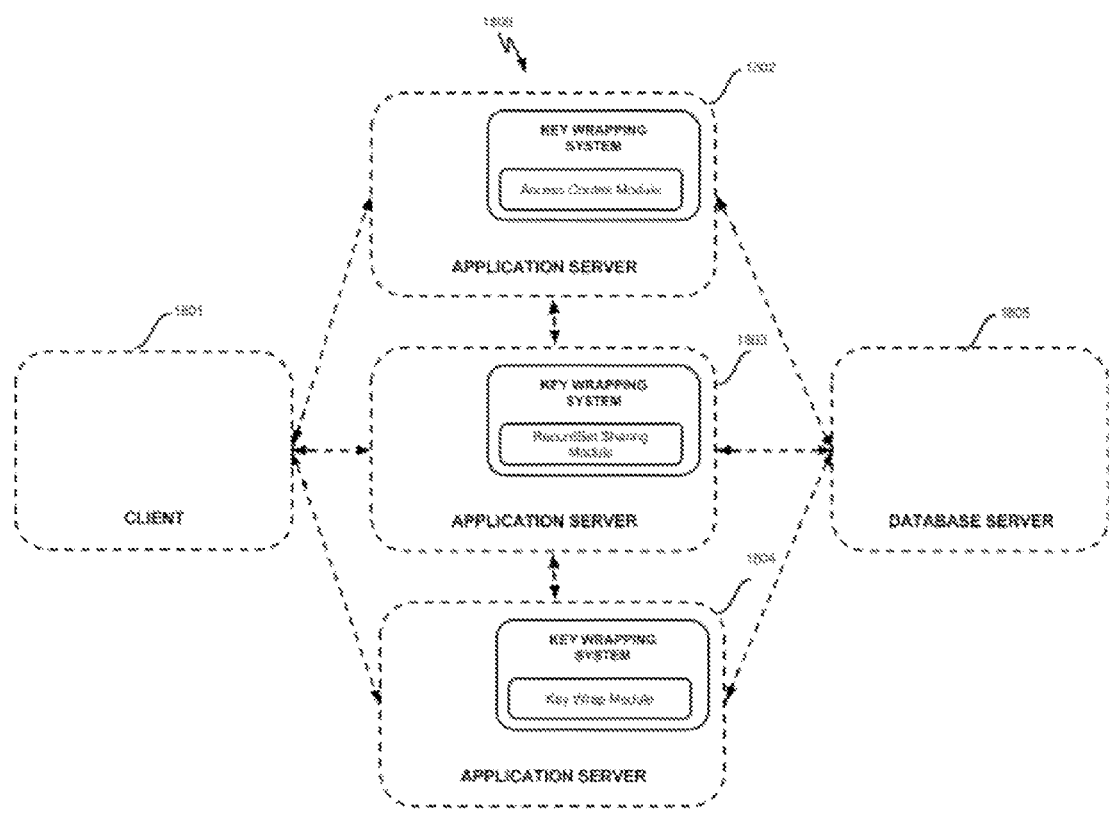
Fig. 18 illustrates an Alternative System Architecture Diagram

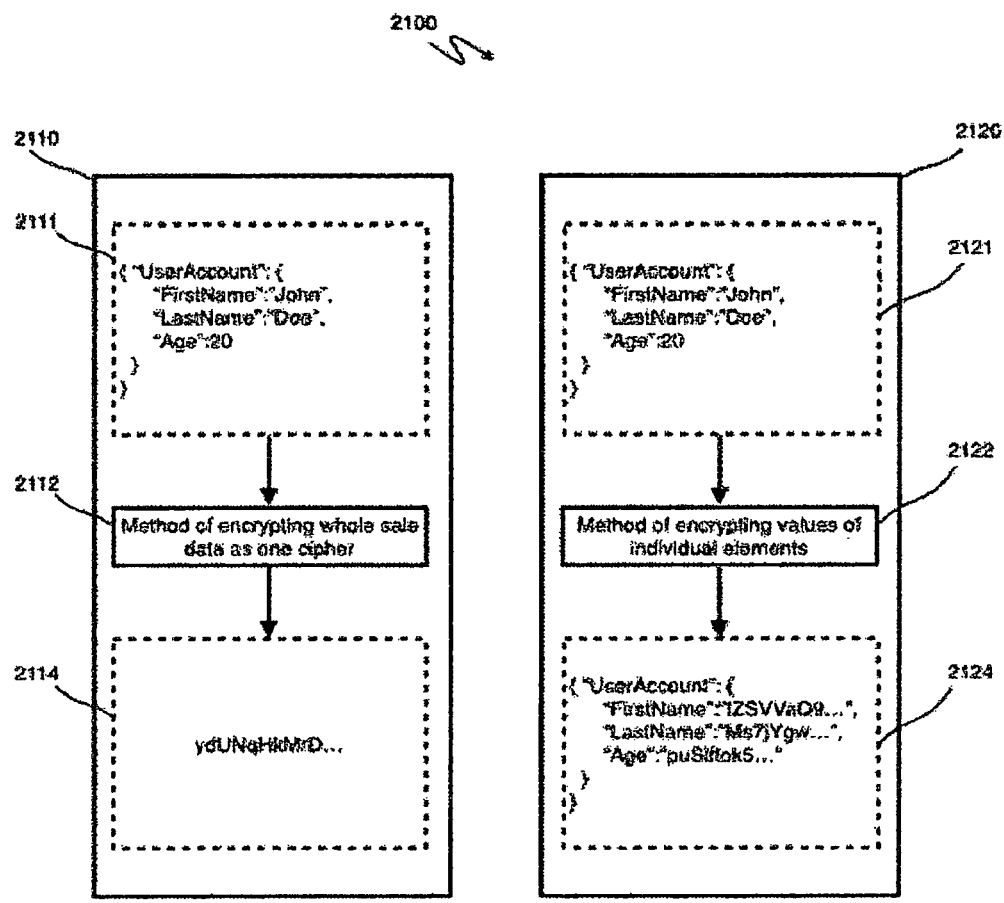
Fig. 19 is a structural view of sale data single cipher vs composite cipher structure.

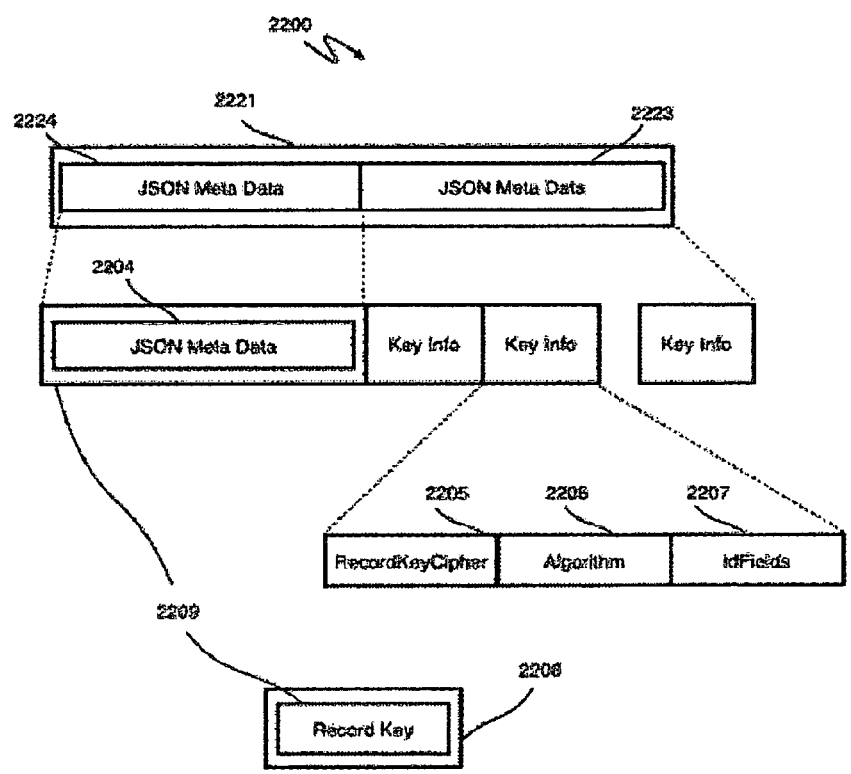
Fig. 20 is a conceptual view of a digital merchandise when used with Key Wrap data sharing technology.

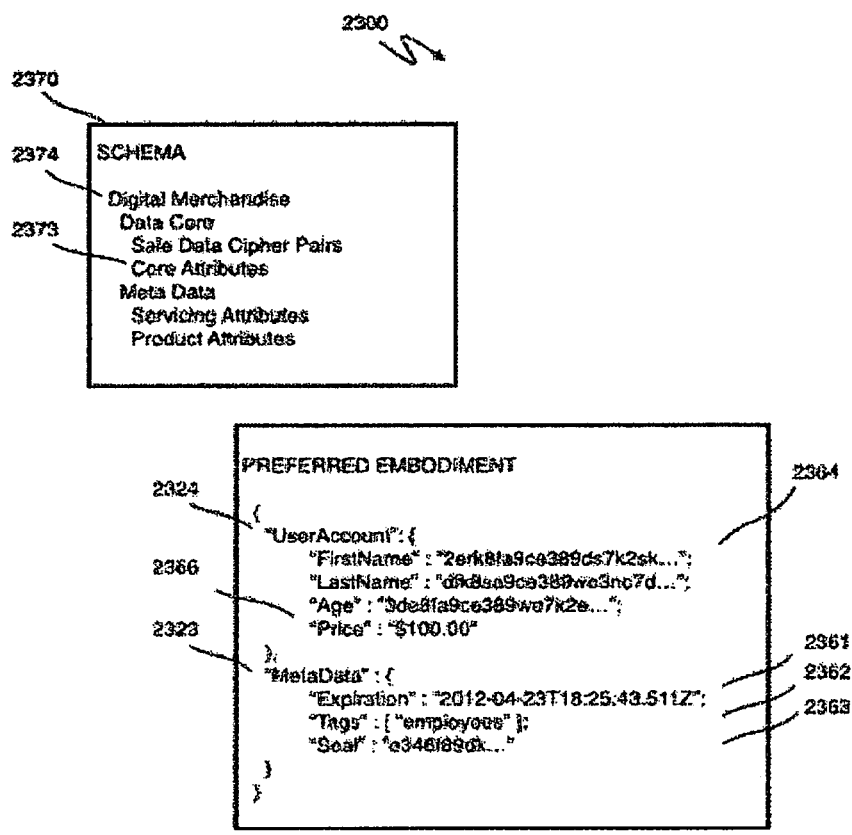
Fig. 21 is a structural view of composite cipher structure wherein values are individually encrypted.

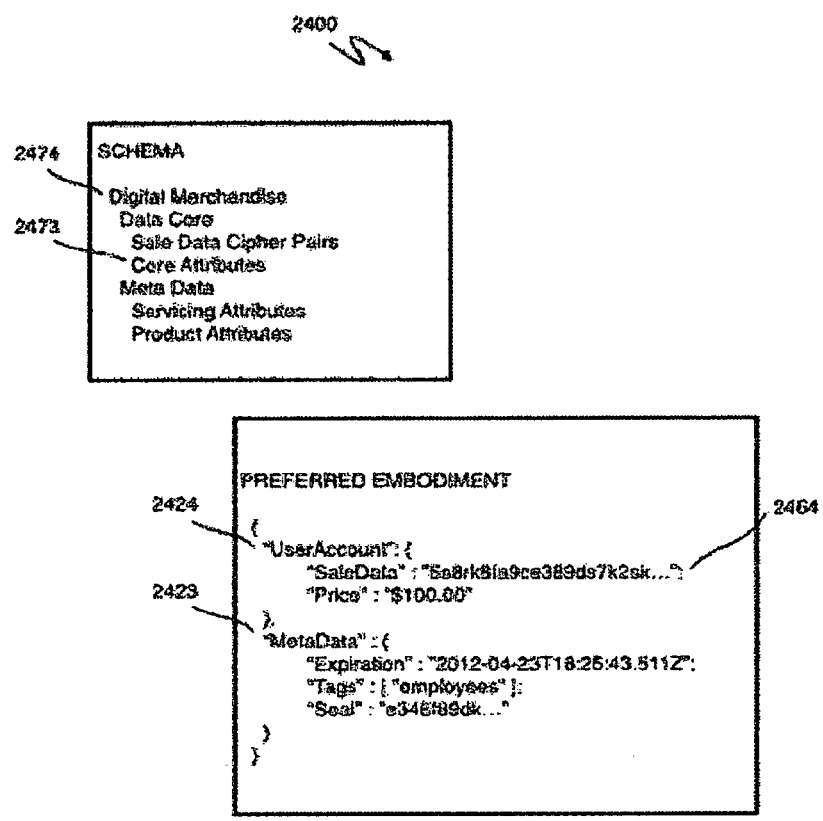
Fig. 22 is a structural view of a digital merchandise, containing a wholly encrypted sale data.

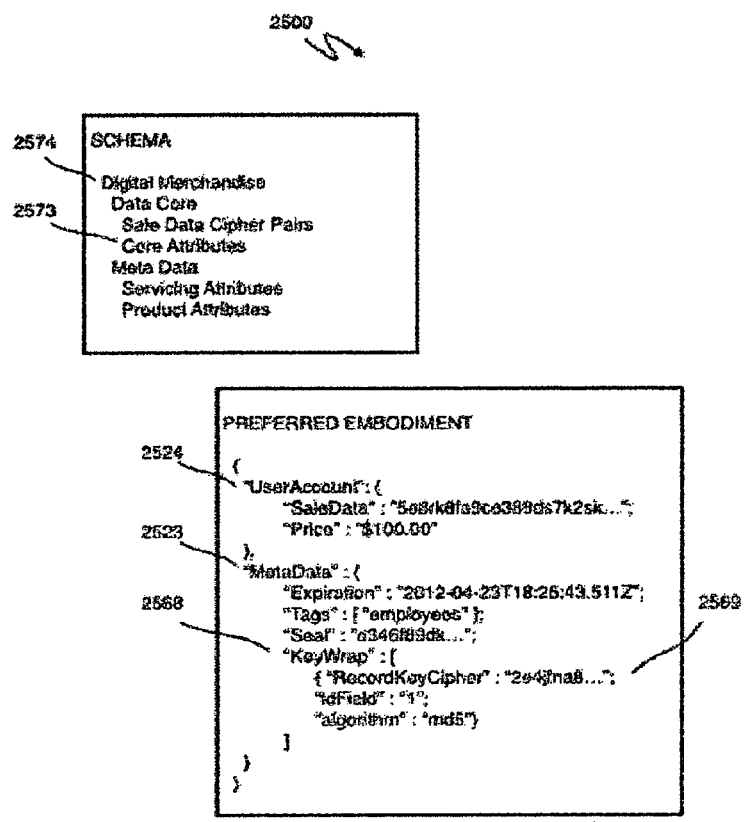
Fig. 23 is a structural view of a digital merchandise when used with Key Wrap sharing technology. Key Wrap RecordSet key is found in Meta Data.

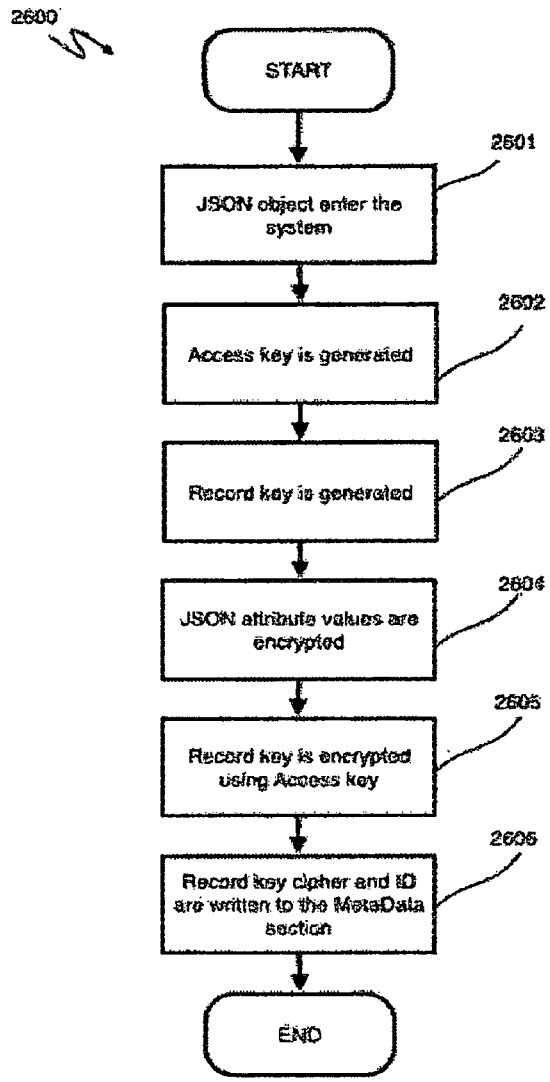
Fig. 24 illustrates the Data Encryption Flow Diagram

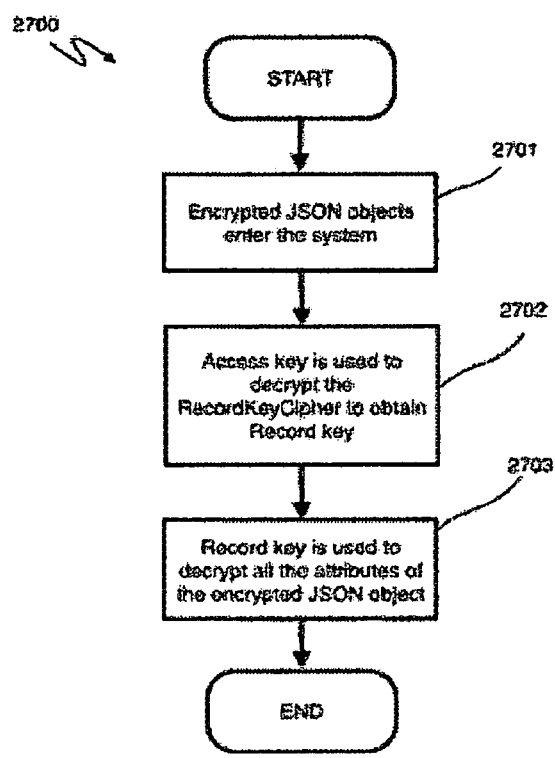
Fig. 25 Illustrates the Data Decryption Flow Diagram

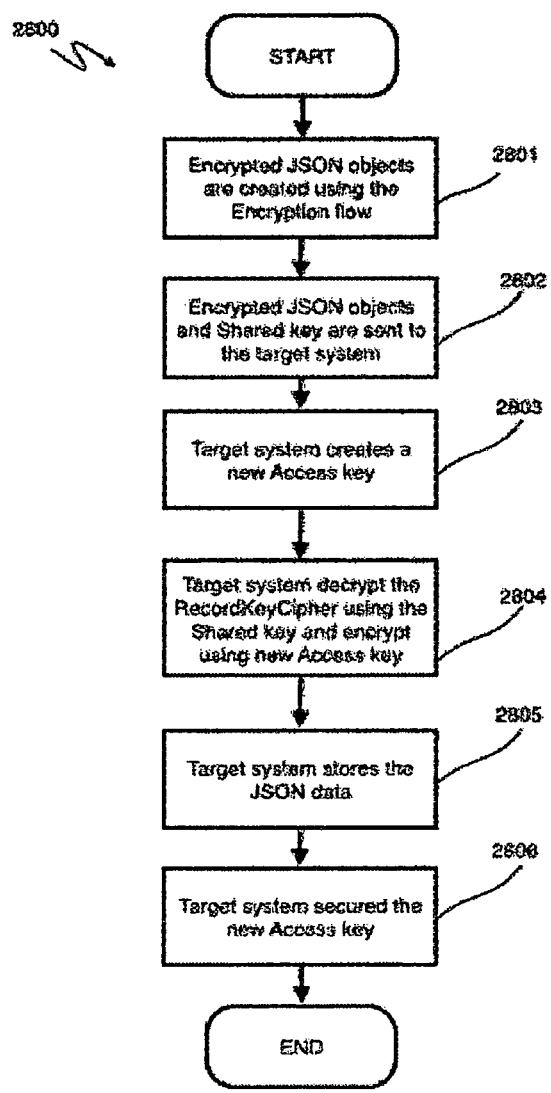
Fig. 26 illustrates the Data Transfer Flow Diagram

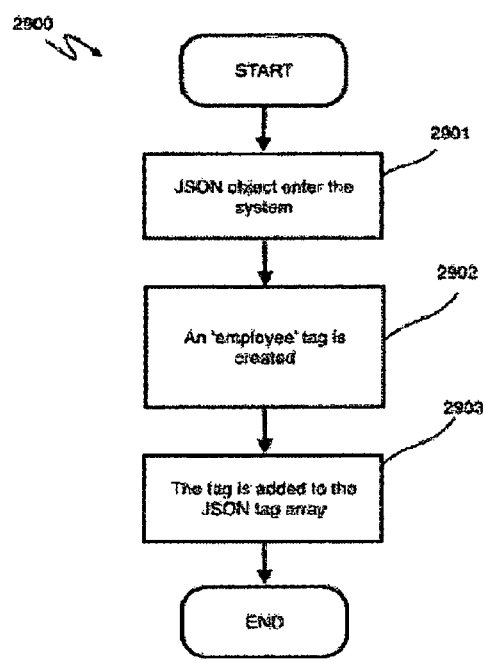
Fig. 27 is a graphical representation of steps of tagging a JSON embodiment according to an aspect of the invention.

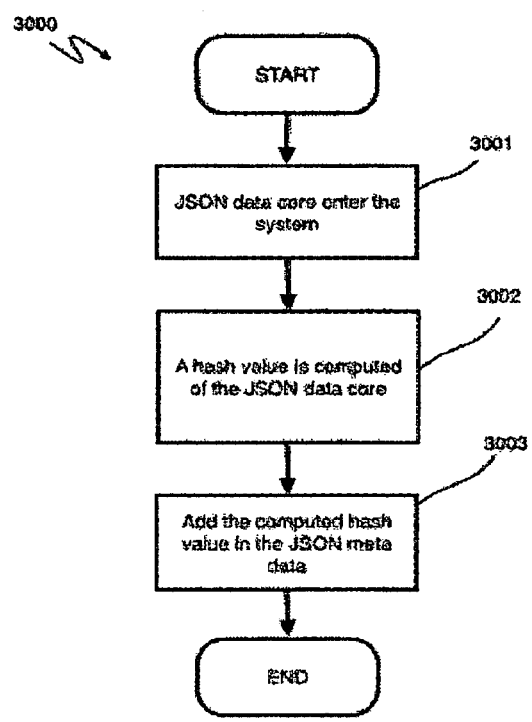
Fig. 28 is a graphical representation of steps of sealing a JSON embodiment according to an aspect of the invention.

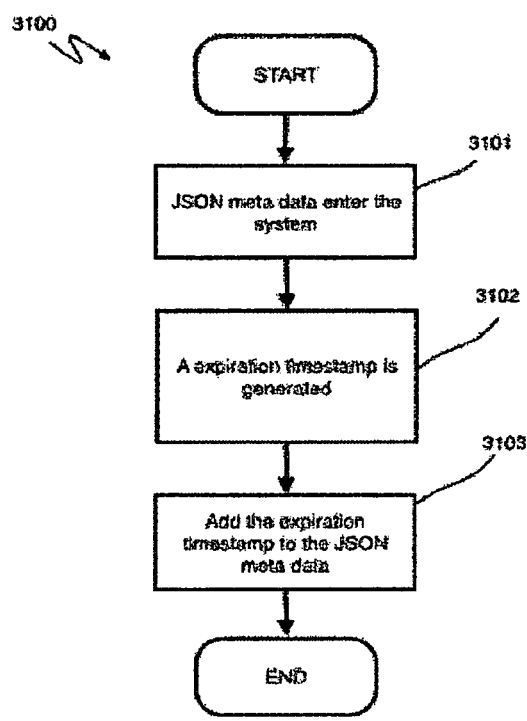
Fig. 29 is a graphical representation of steps of placing an expiration timestamp in an JSON embodiment according to an aspect of the invention.

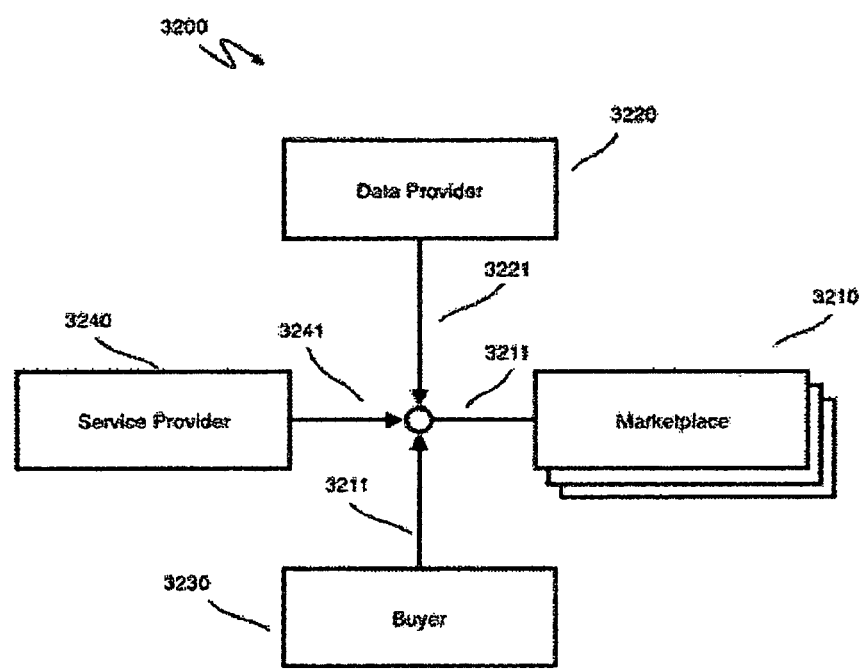
Fig. 30 is a context diagram of trading of text based data representation among stakeholders.

SYSTEMS AND METHODS FOR TRADING OF TEXT BASED DATA REPRESENTATION

FIELD OF THE INVENTION

The field of the invention is access control of key wrapped data encryption and sharing.

BACKGROUND OF THE INVENTION

Data storage in a trust-no-one environment requires encryption keys to be protected. Data sharing requires keys to be shared. These two requirements contradict each other, which is what our key encryption mechanism will solve: A key encryption mechanism that achieves a trust-no-one architecture and facilitates data sharing.

Having direct hardware or database access typically provides a backdoor to shared data in most conventional computer systems; compromising security. An invention of trust-no-one access control is highly desirable.

In a typical computer system, individual records need to be decrypted in order to be shared or regrouped. An invention that can share or regroup encrypted data without any decryption is a more efficient improvement.

In most modern systems, sharing encrypted data requires sharing encryption keys in order for recipients to trust data, to trust the data's origin, and to decrypt data. Key management is an expensive operating overhead in systems that have a lot of keys, data, and users. Alternatively, some systems decrypt and share unencrypted data to avoid key management overhead, and consequently, compromising data security and privacy. An invention that allows sharing encrypted data and encryption keys with minimal key management overhead is highly desirable.

Using this mechanism, records can be stored in their encrypted form without storing any of the encryption keys. No centralized key store is required. None of the record keys, recordset keys, entity keys, token secrets, or the user's passwords, are stored directly in the database. Having direct hardware or database access does not automatically mean one has data access, which is the cornerstone of "Trust No-One" Architecture.

SUMMARY OF THE INVENTION

A key encryption mechanism that achieves a trust-no-one architecture and facilitates data sharing. This mechanism is also distributed and requires no centralized key store. All access control is achieved through the encryption of different keys.

The heart of the key wrapping mechanism is the 3 tier structure: Record, RecordSet and Entity.

Having direct hardware or database access does not automatically mean one has data access, which is the cornerstone of a "Trust No-One" Architecture.

The individual record keys purpose is so that when sharing records, or during regrouping, the records do not need to be decrypted.

When the user changes a user defined key, only the entity key needs to be re-encrypted.

Among the many different possibilities contemplated, additional methods may advantageously be provided to share tokens, create keys, update keys, distribute keys, and modify shared records.

Various objects, features, aspects, and advantages of the present invention will become more apparent from the following detailed description of preferred embodiments of the invention, along with the accompanying drawings in which like numerals represent like components

BRIEF DESCRIPTION OF THE DRAWINGS

FIG. 1 illustrates an Entity Data Structure Diagram
FIG. 2 illustrates a Recordset Data Structure Diagram
FIG. 3 illustrates a Record Data Structure Diagram
FIG. 4a illustrates a Data Decryption Flow Diagram
FIG. 4b illustrates a Data Encryption Flow Diagram
FIG. 5a illustrates a Sharing Token Data Structure Diagram
FIG. 5b illustrates a Sharing Token Record Data Structure Diagram
FIG. 5c illustrates a Sharing Token Validation Workflow Diagram
FIG. 5d illustrates a Data Decryption Flow Using Sharing Token Diagram
FIG. 6a illustrates an Export Token Data Structure Diagram
FIG. 6b illustrates a Data Decryption Flow Using Export Token Diagram
FIG. 7 illustrates a Login Process Flow Diagram
FIG. 8 illustrates a Saving New Record Flow Diagram
FIG. 9 illustrates a Reading Record Flow Diagram
FIG. 10 illustrates a Reading Query Flow Diagram
FIG. 11 illustrates a Regrouping Flow Diagram
FIG. 12a illustrates a Sharing Creation Flow Diagram Diagram
FIG. 12b illustrates a Token-Sharing Flow Diagram
FIG. 12c illustrates an Entity-Sharing Flow Diagram
FIG. 13 illustrates an Assignment Flow Diagram
FIG. 14 illustrates an Export Flow Diagram
FIG. 15 illustrates an Import Flow Diagram
FIG. 16 illustrates an Overall System Architecture Diagram
FIG. 17 illustrates a Data Update Diagram
FIG. 18 illustrates an Alternative System Architecture Diagram
FIG. 19 is a structural view of sale data single cipher vs composite cipher structure.
FIG. 20 is a conceptual view of a digital merchandise when used with Key Wrap data sharing technology.
FIG. 21 is a structural view of composite cipher structure wherein values are individually encrypted.
FIG. 22 is a structural view of a digital merchandise, containing a wholly encrypted sale data.
FIG. 23 is a structural view of a digital merchandise when used with Key Wrap data sharing technology. Key Wrap RecordSet key is found in Meta Data.
FIG. 24 illustrates the Data Encryption Flow Diagram.
FIG. 25 illustrates the Data Decryption Flow Diagram.
FIG. 26 illustrates the Data Transfer Flow Diagram.
FIG. 27 is a graphical representation of steps of tagging a JSON embodiment according to an aspect of the invention.
FIG. 28 is a graphical representation of steps of sealing a JSON embodiment according to an aspect of the invention.
FIG. 29 is a graphical representation of steps of applying camouflage to a JSON embodiment according to an aspect of the invention.
FIG. 30 is a graphical representation of steps of placing an expiration timestamp in a JSON embodiment according to an aspect of the invention.

DETAILED DESCRIPTION OF THE INVENTION

An Entity is referring to users or user-groups who want access to the record.

A System is referring to both a software and hardware implementation of this invention. The techniques presented herein may be implemented with any state of the art computer programming languages (including but not limited to, Javascript, Java, Objective-C, C, C++, C#, PHP, Python, Swift), development tools, platforms or frameworks (including but not limited to LAMP, and MEAN stacks).

Data Store may be representative of a plurality of data stores as can be appreciated.

The Token Key, Entity Key, Record Key, and RecordSet Key are all generated using a bitstream, which can either be a byte, an integer, or a bit sequence. The bitstream can be either system generated, or user defined.

FIG. 1 illustrates an Entity Diagram 100. Users or usergroups who want access to the record set are referred to in this invention as an entity. In order to access the system, Entity record 101 for the given entity, must exist in the system. The Entity record 101 is defined simply with an Entity Name 102 and a randomly generated Entity key 104. The Entity key 104 is encrypted by a user-defined key 105 and the encrypted Entity key 103 is stored in the Entity record 101 object. The User-defined key 105 can be in the form of password, which is the preferred embodiment. Alternative embodiments may be passphrase, physical token such as RSA token, GOOGLE mobile token, SMS passcode, biometric mechanisms such as fingerprints, retina scan, palm print, or X.509 certificate. The reason for a separate Entity key 104 is so when the user changes passwords, only the Entity key 104 needs to be re-encrypted.

FIG. 2 illustrates a RecordSet Diagram 200. The RecordSet 201 is logical groups of records. The RecordSet 201 usually represents all records within a Table (in RDBMS) or Collection (in document or key-value stores) but can also be defined to represent a much smaller or larger set of records.

The RecordSet 201 maintains a list of trusted entities 202. The Trusted Entity List 202 is used for sharing and access control. The Trusted Entity list 202 may contain one or more Entity References 203. The Entity Reference 203 is referring to Entity record 101, that has access to the particular RecordSet 201. When an entity is being assigned to RecordSet 201, that Entity Reference 203 is added to the Trusted Entities list 202.

The Entity Reference 203 contains 3 sections: Entity Name 204, Access Level 205, and RecordSetKeyCipher 206. The Entity Name 204 is the name of the entity that has access to the RecordSet 201. The Access Level 205 indicates the abilities the entity can perform on the RecordSet 201. The Access Level 204 can have the value of either READONLY or READWRITE. The RecordSetKeyCipher 206 is essentially the encrypted RecordSet key 207. The RecordSet key 108 is a random generated key that was created when the RecordSet 201 got created. The RecordSet key 207 is encrypted by the Entity key 104 to form the RecordSetKeyCipher 206.

FIG. 3 illustrates a Record Diagram 300. The Record 301 serves as a basic container where the data portion is protected via the key wrapping mechanism of the invention. The Record 301 data structure is divided into two sections: Record Data 302 and Record Meta Data 303.

Data 304 in the Record Data section 302 is protected by a Record key 308. The Record key 308 is generated during record creation time and will stay with the record for the life-time of the record. The purpose of having individual Record keys 308 is so that the records 301 do not need to be decrypted when sharing records, or during regrouping.

The Record MetaData section 303 may contains one or more RecordSet References 305. The RecordSet Reference 305 is referring to a logical group of Records 301 which is know as RecordSet 201 in this invention. The implication is that each Record 301 can belong to multiple logical groups. Data sharing and data access control of this invention is being controlled via the use of the RecordSet Reference 305. The Record 301 can be shared to multiple users/entities. The Entity would only have access to records based on the RecordSet 201 that the entity belongs to.

Each RecordSet Reference 305 contains the RecordSetId 306 and the RecordKeyCipher 307. The RecordSetId 306 identifies the RecordSet 201 that Record 301 belongs to. The Record key 308 is encrypted by the RecordSet key 207 to form the RecordKeyCipher 307. The RecordKeyCipher 307 is stored in the Record MetaData section 303 and will be used with the RecordSet key 207 to obtain the Record key 308 to unlock the encrypted data 302.

FIG. 4a illustrates a Data Decryption Flow Diagram 400. In operation 401, the encrypted Entity key 103 is decrypted using the User-defined key 105, to obtain the Entity key 104. The Entity key 104 is then used to decrypt the RecordSetKeyCipher 206 to obtain the RecordSet key 207 in operation 402. The RecordSet key 207 is used to decrypt the RecordKeyCipher 307 to obtain the Record key 308 in operation 403. And lastly, the Record key 308 is used to decrypt the data 304 in operation 404.

FIG. 4b illustrates a Data Encryption Flow Diagram 410. In operation 411, the data 304 is encrypted by the Record key 308. The Record key 308 is encrypted by the RecordSet key 207 to form the RecordKeyCipher 307 in operation 412. The RecordKeyCipher 307 is stored in the Record 301 along with the encrypted data 302. The RecordSet key 207 is encrypted by the Entity key 104 to form the RecordSetKeyCipher 206 in operation 413. The RecordSetKeyCipher 206 is stored in the RecordSet 201. And lastly, the Entity key 104 is encrypted using a User-defined key 105, in operation 414.

FIG. 5a illustrates a Sharing Token Data Structure Diagram 500. The Sharing Token allows the entity to share data with other entities. The Sharing Token 501 consists of two parts: Token Key 502 and Token Secret 503. The Token key 502 is used as an identifier to locate the token record 511 in the system. The Token Secret 503 is used to decrypt the RecordSet key 207, thus allowing access to the record set. The Token Secret 503 is not being stored in the system data store.

FIG. 5b illustrates a Sharing Token Record Data Structure Diagram 510. The Sharing Token Record 511 is the Token object stored in the data store. The Sharing Token Record 511 contains the information about the token such as Expiration Date, type, etc. The system uses the Sharing Token Record 511 to verify and validate accessibility of the Sharing Token 501. The Sharing Token Record 511 is divided into 5 parts: Token Key 512, Expiration Date 513, Type (TOKEN-ACCESS, ENTITY-ACCESS, and ENTITY-ASSIGN) 514, Target Entity Id 515, RecordSetKeyCipher 516.

The Token Key 512 must match with the Token Key 502 of the Sharing Token 501. The Expiration Date 513 allows the system to determine if the token is still valid. The Type 514 identifies the type of the sharing. The Target Entity Id 515 identifies the entity that has access to use the share token. The RecordSetKeyCipher 516 is the encrypted RecordSet that can be decrypted by using the Sharing Token Secret 503.

FIG. 5c illustrates a Sharing Token Validation Workflow Diagram 520. The system uses the Token key 502 to locate the Token record 511 in operation 521. In operation 522, the system checks to see if the token is found. If the token is not found, an error is returned. If the token is found, the system checks to see if the token is still valid by checking the token Expiration Date 513 in the operation 523. If the token is successfully validated, it will be returned for use, however if the token is invalid, an error is returned.

FIG. 5d illustrates a Data Decryption Flow Using Sharing Token Diagram 530. The Sharing Token secret 503 is used to decrypt the RecordSetKeyCipher 206 to obtain the RecordSet key 207 in operation 531. The RecordSet key 207 is used to decrypt the RecordKeyCipher 307 to obtain the Record key 308 in operation 532. And lastly, the Record key 308 is used to decrypt the data 304 in operation 533.

FIG. 6a illustrates an Export Token Data Structure Diagram 600. The system is designed to allow record export and import in encrypted format. This allows records to be transferred to another system using the same key encryption scheme without having to decrypt first, thus substantially increasing security. The Export Token 601 is used to send encrypted records to another system. The Export Token 601 is similar to share tokens except that it only need half of the key. Unlike the Share Token 501, which will encrypt the recordSet key, the Export Token 601 is used in place of the RecordSet key 207. During an export, the RecordKeyCipher 307 of each exporting record will be rekeyed with the Export Token 601.

FIG. 6b illustrates a Data Decryption Flow Using Export Token Diagram 610. Unlike the Share Token 501 which will decrypt the RecordSet key 207, the Export Token 601 is used in place of the RecordSet key 207. During an export, the RecordKeyCipher 307 of each exporting record will be rekeyed with the Export Token 601.

FIG. 7 illustrates a Login Flow Diagram 700. The Entity must authenticate with the system to gain access and functionalities. In operation 701, the entity logs in via a user-interface to the system. The login user-interface can be in the form of Web user-interface or a program that issues a login sequence to the system. The authentication process generally requires a username and user-defined key 105 to be passed in. In operation 702, the system checks if the entity has permission to access the system, and whether the user-defined key 105 is valid. If the entity does not have a permission or has invalid credentials, an error message is returned in operation 704. If the authentication is successful, an access token is returned to the entity. An Access token is the authorization token that allows the entity to make calls to methods of the invention.

FIG. 8 illustrates a Saving New Record Flow Diagram 800. In operation 801, the entity submits a new data record to the system. The system determines if the record set exists in the data store in operation 802. If the record set is not found, a new RecordSet 201 is created and the RecordSet key 207 is generated. If the record set is found, the RecordSetKeyCipher 206 is decrypted by the Entity key 104 to obtain the RecordSet key 207. The New Record 301 is created and the Record key 308 is generated. The Data 304 is encrypted using the Record key 308 and the Record key 308 is encrypted using the RecordSet key 207. The New Record 301 is stored to the data store in operation 803. Furthermore, a response is send back to the entity in operation 804.

FIG. 9 illustrates a Reading Record Flow Diagram 900. In operation 901, the entity submits a request to view the contents of the record set. The system determines if the record set exists in the data store in operation 902. If the record set is found, the system validates access of the Entity against the record set Trusted Entity list 202. If the access is valid, the system retrieves records for the given record set from the data store in operation 903. The records are decrypted using the Data Decryption Flow Diagram 400 and sent back to the entity in operation 904.

FIG. 10 illustrates a Reading Query Flow Diagram 1000. In operation 1001, the entity submits a request to view the contents of the record set with conditions. The extra conditions are used to filter the record results for the selected record set. The system determines if the record set exists in the data store in operation 1002. If the record set is found, the system validates access of the Entity against the record set Trusted Entity list 202. If the access is valid, the system retrieves the records for the given record set with the conditions from the data store in operation 1003. The records are decrypted using the Data Decryption Flow Diagram 400 and decrypted records are sent back to the entity.

FIG. 11 illustrates a Regrouping Flow Diagram 1100. In operation 1101, entity submits a request for the selected records to be regrouped to a different record set. The system determines if the source record set exists in the data store in operation 1102. The system checks if entity have access to the source record set. The system retrieves selected records from the source record set in operation 1103. The system determines if the destination record set exists in the data store in operation 1104. If the destination record set is found, the system determines if the entity belongs in the record set Trusted Entity list 202. If the destination record set is not found, the system creates a new record set and the entity name is added to the new record set Trusted Entity list 202. For each of the selected records, the system encrypts the Record key 308 with the destination RecordSet key 207 and the Record MetaData section 303 is updated to the data store in operation 1105. The system returns response back to the entity in operation 1106.

FIG. 12a illustrates a Sharing Creation Flow Diagram 1200. There are 3 levels of sharing: Token-Sharing, Entity-Sharing, and Entity-Assigning. In operation 1201, the entity selects a record set to be shared, and sets the share duration period. The Entity submits a request to the system to obtain Share Token 501. The system determines if the selected record set exists in the data store in operation 1202. If the record set is found, the system validates access of the Entity against the record set Trusted Entity list 202. The system created the Share Token Record 511 into the data store in operation 1203. The RecordSet key 207 is encrypted using the Shared Token Secret 503 and stored as a RecordSetKeyCipher 516 of the Sharing Token Record 511. The system also creates the Share Token 501 which is send back to the entity in operation 1204. Upon receiving the token, the entity sends the Share Token 501 to the target party.

FIG. 12b illustrates a Token-Sharing Flow Diagram 1210. Token-Sharing (token type=TOKEN-ACCESS) allows access to anybody with the token. The Target party does not need to be a valid entity in the system. Token-sharing provides view access to anybody who has the token. Token-Sharing is a way to create public access to part of your data. In operation 1211, the entity submits a request to access a record set using the Share Token 501. Using the Token key 502, the system locates the token in the data store in operation 1212. The system validates the Sharing Token using the steps found in the Sharing Token Validation Workflow Diagram 520. The system determines if the RecordSet 201 exists in the data store in operation 1213. If the RecordSet 201 is found, the RecordSet 201 is decrypted using Token Secret 503. The system retrieves all Records 301 for the given RecordSet 201 in operation 1214. The records are decrypted and returned to the entity in operation 1215.

FIG. 12c illustrates an Entity-Sharing Flow Diagram 1220. Entity-Sharing (token type=ENTITY-ACCESS) requires the entity to exist in the system. When the Target Entity Id field is not empty, only the named entity can access the share. Otherwise, any valid entities of the system could access the share. In operation 1221, the entity submits a request to access a record set using the Share Token 501. Using the Token key 502, the system locates the token in the data store in operation 1222. The system validates the Sharing Token using the steps found in the Sharing Token Validation Workflow Diagram 520. The system determines if the entity is a valid entity in the system and if the entity has access to the record set in operation 1223. The system determines if the RecordSet 201 exists in the data store in operation 1224. If the RecordSet 201 is found, the RecordSet 201 is decrypted using Token Secret 503. The system retrieves all Records 301 for the given RecordSet 201 in operation 1225. The records are decrypted and returned to entity in operation 1226.

FIG. 13 illustrates an Assignment Flow Diagram 1300. The assignment of a record-set to another entity is done through the share token type ENTITY-ASSIGN. The entity that was assigned with the said token will have full access of the record set which including but not limited to assignment rights to the other entities and abilities to create shares. TOKEN-ACCESS or ENTITY-ACCESS can be used instead to restrict access to readonly. In operation 1301, the entity submits a request to the system to claim the assignment. The system validates the Sharing Token using the steps found in the Sharing Token Validation Workflow Diagram 520. The system retrieves the shared record set from the data store in operation 1302. The system adds the entity to the record set Trusted Entity list and updates the data store in operation 1303. The system sends a response back to entity in operation 1304.

FIG. 14 illustrates an Export Flow Diagram 1400. In operation 1401, the entity selects a record set. Within the selected record set, the entity selects records to be exported and submits the request to the system. The system determines if the source record set exists in the data store in operation 1402. If the source record set exists, the system determines if the Entity exists in the the record set Trusted Entity list 202. The RecordSet key 207 is obtained by decrypting the RecordSetKeyCipher 206 with the Entity key 104. The system retrieves the selected records from the data store in operation 1403. The Export token 601 is created by the system. For each Record 301, the RecordKeyCipher 307 is decrypted by the RecordSet key 207 to obtain the Record key 308 and the Record key 308 is encrypted by the Export token 601. The records are written into a file by the system and both the Export file and Export token 601 are sent to the target entity.

FIG. 15 illustrates an Import Flow Diagram 1500. In operation 1501, the entity uploads a file for import and enters the Export token 601. The Entity either selects an existing record set or creates a new record set to import data into. In operation 1502, the system decrypts the file using the Export token 601. The system determines if the target record set exists in the data store. If the target record set exists and entity is not in the target record set Trusted Entity list 202, the system adds the entity information to the list. If the record set does not exist, a new RecordSet 201 is created and the Entity is added to the record set Trusted Entity list 202. The Import Record Record key 308 is encrypted with the target RecordSet key 207 and the Import Records 301 are written to the data store. The system returns a response to the entity in operation 1503.

FIG. 16 illustrates an Overall System Architecture Diagram 1600, representing one preferred embodiments. The client section 1601 can be in the form of a web app, custom native app, or browser running on a computing device, including desktops, laptops, mobile devices, cellular phones, tablet computer systems or other devices with like capability. Data is sent and received to and from the client to the application server section 1602. The Application Server section 1602 handles requests coming in from the clients. Optionally, the software package is referring to a server application(s) in which data is being protected using the method of this invention. The software framework is referring to programming languages, compilers, code libraries, and tools sets; that are used to implement the method of this invention. The system may contains several modules such as: Access Control module, RecordSet Sharing module, and Key Wrap module. The Database Server section 1603 is accessible by the Application Server section 1602. Various data related to this invention is stored in a data store in this Database Server section 1603.

Record Key 308 may not be publicly shared. As such, vulnerabilities of any sharing acts alone would not compromise access to Record Key 308. At renewal of some RecordSet Key 207, there would be no need to renew associated Record Keys 308. There would also be no need to generate new Record Keys 308, and no need to encrypt again Record Data 302. The is a potential gain in performance and efficiency as a result. However, using new Record Keys 308 while replacing a RecordSet Key 207 may be useful in some alternative use cases.

RecordSet 201 and Shared Tokens 511 may be associated with Access. When access is revoked, RecordSet Keys 207 may be renewed, yet no need to renew Record Keys 207. Expiration by date and time is a preferred embodiment, while alternative embodiments may also be implemented using a shared token 511, or RecordSet 201, or Trusted Entity List 202. In some alternative embodiments, renewal of Record Keys 308 and Record Data 304 may also be advantageous.

In the preferred embodiment, JSON is thought to be the choice of data representation, and thus is used for illustration purpose in many of the diagrams wherever applicable.

FIG. 1 is a structural view of sale data single cipher vs composite cipher structure 2100. This diagram 2100 illustrates the difference between the JSON Encryption using method of encrypting sale data as a single cipher 2110, and the method of encrypting individual values to result in a composite cipher structure 2120.

Method 2110 illustrates the flow of turning JSON data into a single cipher. JSON data enters the system in step 2111, which is then encrypted using an encryption method in step 2112. The result of the encryption is a long string as seen in step 2114, resulting in a single cipher.

Method 2120 illustrates the flow of turning JSON data into a composite cipher structure. JSON data enters the system in step 2121, which is then encrypted using an encryption method in step 2122, resulting in the same JSON structure wherein all contained values are encrypted as ciphers. The result found in step 2124 is still a JSON data where the original name-value pair structure is preserved.

The encryption method used can be any modern methods capable of carrying out cryptology. SHA 256 and AES are among the many alternatives contemplated.

FIG. 2 is a conceptual view of a digital merchandise 2370 when used with Key Wrap data sharing technology 2200. The Encrypted JSON Record 2221 serves as a basic container that is divided into two sections: JSON Data Core 2224 and JSON Meta Data 2223.

The JSON Data Core 2224 section contains the encrypted JSON Sale Data 2204. A Record key 2209 is a randomly generated key that was generated at encryption time. Each Encrypted JSON Record 2221 is associated to a unique Record key 2209. The Record key 2209 should stay with the Encrypted JSON Record 2221 for the lifetime of the Encrypted JSON Record 2221. The Record key 2209 is used to encrypt and decrypt the JSON Sale Data 2204. The Record key 2209 is encrypted and stored in the Record Meta Data 2223 section as the RecordKeyCipher attribute 2205.

The Encrypted JSON Meta Data 2223 section contains elements that provide information about the encryption of the data such as RecordKeyCipher 2205, Algorithm 2206, and idFields 2207. In some embodiments, the Record Meta Data 2223 may contain an array of one or more of these attributes.

The RecordKeyCipher 2205 element contains the encrypted Record key 2209. The Access key 2208 encrypts the Record key 2209. The Access key 2208 is a randomly generated key string. The purpose of the Access key 2208 is to provides users with access to the JSON Sale Data 2224. Only users with the Access key 2208 would be able to decrypt the Record key 2209 and ultimately using the Record key 2209 to decrypt JSON Data Core 2224 to obtain the Sale Data 2204. An important advantage of using Access key 2208 during sharing and data transfer is that the encrypted JSON Data Core 2224 does not need to be decrypted, and the Record key 2209 does not need to be shared. In some embodiments, the Access key 2208 may be used to encrypt group of Record keys 2209 hence giving users access to a subset of records.

The Algorithm 2206 attribute identifies the crypto algorithm used to encrypt the data as well as the Record key 2209. This helps to ensure obtaining the original sale data by using the same consistent algorithm for decryption.

The idFields 2207 contains a list of id fields that will not be encrypted by the encryption method. The ID field attribute contains a list of attributes that represent the object's identities. These attributes will not be encrypted and will remain in plain text. Many databases require ID fields in order to store JSON objects. If the content in the ID fields point to an embedded object, the entire object will not be encrypted.

FIG. 3 is a structural view of a composite cipher structure wherein values are individually encrypted 2300. It illustrates both a pseudo schema definitions and an JSON example that is the preferred embodiment. It also illustrates Meta Data 2323 and a Data Core 2324 in pseudo schema definitions, and what they would look like in JSON. The corresponding pseudo definitions are shown in 2370.

In the preferred embodiment, a composite cipher structure is used to store individually encrypted values 2364. The advantage of a composite cipher structure is the capability to support discovery and analysis of the Sale Data 2364 without decrypting any of the values. Note that there is an additional price element 2366 in this illustration. The price element is an example of a core attribute 2373 that is stored unencrypted in the Data Core 2324.

FIG. 3 also depicts how servicing attributes and product attributes are stored in the Meta Data 2323. For illustration purpose, FIG. 3 shows an expiration timestamp 2361, a social network tags array 2362, and a seal hash value 2363, which are among some of the possible attributes contemplated to be present in the preferred embodiment. It is possible that the actual presence of the individual attributes is optional depending on the actual usages. Additional elements are possible and likely as well.

FIG. 4 is a structural view of a single cipher, the result of encrypting sale data as a whole 2400. Similarly as in FIG. 3, Meta Data 2423 and Data Core 2424 are also shown, as well as the pseudo definitions of the corresponding sections 2473 and 2474. It should be noted that the Sale Data 2464 is encrypted as a single cipher to store in the Data Core 2424, in contrast to the composite cipher structure 2364 as shown in FIG. 3 2300. While this does not allow discovery and analysis of the Sale Data, this could be an alternative to the composite cipher structure when concealment of the Sale Data is desirable.

FIG. 5 is a structural view of digital merchandise when used with Key Wrap sharing technology 2500. In the preferred embodiment, Key Wrap RecordKeyCipher 2205, idField 2207, and algorithm 2206 can all be found in Meta Data 2568. Note that even though only one set of Key Wrap Key Info is shown in FIG. 5 2500, it is typically more common to have multiple Key Info present at the same time as shown in FIG. 2 2200.

FIG. 6 illustrates the Data Encryption Flow Diagram 2600. One or more JSON objects enter the system to be encrypted in step 2601. Either, a new Access key 2208 is generated or an existing Access key 2208 can be reused in step 2602. For each of the JSON objects, a Record key 2209 is created in step 2603. The Record key 2209 is then used to encrypt the JSON Sale Data 204 in step 604. The encrypted JSON data is stored in the JSON Data Core section 2224. The Record key 2209 is encrypted by the Access key 2208 in step 2605 which results into a RecordKeyCipher 2205. The RecordKeyCipher 2205 is then stored in the Meta Data section 2223 of the Encrypted JSON Record 2221.

FIG. 7 illustrates the Data Decryption Flow Diagram 2700. JSON Record 2221 enters the system in step 2701. For each JSON Meta Data 2223, the system uses the Access key 2208 to decrypt the RecordKeyCipher 205 to obtain the Record Key 2209 in step 2702. The system then uses the Record Key 2209 to decrypt the JSON Data Core 2224 to retrieve Sale Data 2204.

FIG. 8 illustrates the Data Transfer Flow Diagram 2800. JSON record 2221 can be transferred from one system to another without the need of decrypting and re-encrypting the data. In step 2801, a JSON record 2221 is selected for sharing. As part of the data transfer, either the Access key 2208 or a new generated Access key 2208, referring to in the rest of the steps as Shared key, is also required. The JSON record 2221 and the Shared key 2208 are sent to the Target system in step 2802. Ideally the JSON record 2221 and the Shared key 2208 should be sent separately to ensure data integrity.

Upon receiving both the JSON record 2221 and the Shared key 2208, the Target system generates a new target Access key 2208 in step 2803. In step 2804, the Target system decrypts the RecordKeyCipher 2205 using the Shared key 2208 to obtain the Record key 2209. The Target system then encrypts the Record key 2209 with the new target Access key 2208. The Shared key 2208 can now be discarded as it is no longer needed. The Target system stores the Encrypted JSON objects into their data stores in step 2505. The Target system securely protects the new Access key in step 2506.

FIG. 9 is a graphical representation of steps of tagging a JSON embodiment according to an aspect of the invention 2900. For illustration purpose, a tag 'employee' is created 2902 and placed in an tags array 2903. Among the many alternatives contemplated, social networking tags and feedback are thought to be the most common product attributes. For illustration purpose, there is one tags array for each JSON, although it is likely to have one or more tags array in alternative embodiments. A tag is a commonly used feature in social networking, adding descriptions in the form of meta data, so users may understand the content of the resource without first needing to download the content.

FIG. 10 is a graphical representation of steps of sealing a JSON embodiment according to an aspect of the invention 1000. A hash value is computed by taking as input the whole JSON Data Core 3002, including both the Sale Data and core attributes as one unit of integrity control. The result is then added to Meta Data 3003 as a seal hash value 2363. The hash value could be computed by using one of the many modern cryptographic checksum methods. Among the alternatives contemplated, MD5 and SHA-1 are thought to be the choices in the preferred embodiment. The seal hash value 2363 is one of the product attributes contemplated in the preferred embodiment. One advantage of using product attributes is to allow extensible markup of a data merchandise 2374, wherein data core and attributes can become recursively part of another data merchandise, resulting in one or more layers of attributes. This ability to be recursively extensible is inherent in text based data representations.

FIG. 11 is a graphical representation of steps of adding warranty expiration in a JSON embodiment according to an aspect of the invention 3100. An expiration timestamp is generated 3102 in a format specific to the JSON embodiment, and is then placed in the Meta Data 3103. Warranty expiration is an example of a servicing attribute, and is among many servicing attributes contemplated to present in the preferred embodiment. Servicing attributes provides custom support to multiple service providers, allowing attributes and values that may be specific to each individual service providers, trading transactions, or a combination of both.

FIG. 12 is a context diagram of trading of text based data representation among stakeholders and marketplace 3200. This diagram illustrates the various roles identified in the preferred embodiment, including data providers 3220, buyers 3230, and service providers 3240, all of which are connected to marketplace 3210 in an online network. A digital merchandise may be listed for sale in one or more marketplaces 3210, and also traded among the stakeholders through the use of a marketplace's online API 3211. An online API (Application Programming Interface) is a set of software protocols accessible to stakeholders over a computer network, and it is through these protocols that trade transactions are carried out. When data providers 3220 list sale data on a marketplace 3221, the online API 3211 automatically convert such sale data into digital merchandise representation 2370. Data providers can be allowed to provide updates to sale data, whereas the online API will typically apply these updates to the core attributes of sale data.

On the other hand, the online API 3211 makes it possible for buyers 3230 carry out various trade transactions, such as browsing for sale data and their list prices 3231. When trade transactions successfully complete, access keys are typically provided through the online API 3211 to buyers, for the delivery of purchased digital merchandise. Furthermore, the online API provides support of transactions that may not be directly related to transactions of trading of sale data. Examples include support of social network tags or feedback provided by potential buyers. The online API to the product attributes of sale data typically applies such updates.

Service providers 3240 are authorized parties who have administrative access to sale data, who can provide updates to the servicing attributes of sale data 3241. One of the many servicing attributes that have been contemplated is a warranty expiration date, whose values can vary depending on one or more factors, such as date of transaction, license agreements, and so on.

In addition to data providers 3220, buyers 3230, and service providers 3240, other roles have also been contemplated in alternative embodiments. It is thought that their use of the marketplace is to be carried out through the same online API identified in the preferred embodiment.

Data 304 can be changed efficiently. The same Record Key 308 can be used to encrypt changed data, and Record Data 304 can be replaced without changing any Record Key 308 or RecordSet Keys 207. FIG. 17 illustrates a Data Update Diagram 1700. Operations 1701, 1702, 1703, and 1704 are the Data Decryption steps found in FIG. 4a diagram. Data 304 is updated with the changes in operation 1705. Using the same Record Key 308, data 304 is encrypted and updated to the data store in operation 1706.

Access Control module, RecordSet Sharing module, and Key Wrap module can run all at the same location (see FIG. 16 diagram), separate locations, or a combination of both. There may or may not be firewalls between each modules. Data and keys may not be required to upload to a single location in order to share. FIG. 18 illustrates an Alternative System Architecture Diagram 1800. In some scenarios, there may be a need for each module to be on different computing environments.

PATENT CITATIONS

| Cited patent application | Filing Date | Publication Date | Applicant | Title |
|---|---|---|---|---|
| 14/050,947 | Oct. 10, 2013 | Jul. 10, 2014 | SafelyLocked, LLC | TECHNIQUES FOR SECURE DATA EXCHANGE |

The invention claimed is:

1. A Trust-No-One system for sharing encrypted information among users securely and yet efficiently, wherein encryption keys are encrypted by using randomly generated keys when in storage, and users are kept out of possession of encryption keys in decrypted forms when in use, comprising:

a processor that generates a Record, a Recordset, and an Entity, wherein the Entity is coupled with the Record via the Recordset;

a first memory for storing an encrypted Entity Key in the Entity, storing an encrypted Record Key in the Record, and storing the RecordSet that couples the Entity and the Record;

a second memory for executing decryption, wherein a secret is used to decrypt the encrypted Entity Key, the decrypted Entity Key is further used to decrypt the encrypted RecordSet Key, the decrypted RecordSet Key is further used to decrypt the encrypted Record Key, and the decrypted Record Key is further used to decrypt data encrypted in the Record; and a memory storing instructions configured to be executed by the processor to implement an encrypted record and encryption keys wrapping method, wherein the processor further receives a request of access to the Record from the Entity, determines a permission to access the Record based on decrypting the Record Key associated with the Record using the RecordSet Key and the Entity Key associated with the Entity in the second memory, and allowing the permission to access the data when the decrypting of the Record Key is successful.

2. The system of claim 1, wherein the system further comprises an access control method that enables sharing access without a centralized key store, the method comprising:

adding a token-type in each of said tokens, wherein said token-type is of type TOKEN-ACCESS, ENTITY-ACCESS, or ENTITY-ASSIGN;

sharing tokens among user entities and user group entities, and by adding each of said user entities and user group entities to said Trusted Entity List;

locating said Trusted Entity Lists by means of entity keys stored in each of said tokens; and decrypting said entity keys by means of said secrets in each of said tokens.

3. The system of claim 1, wherein the system further comprises a rekey method to update said recordset key without decryption of said records.

4. The system of claim 1, wherein the system further comprises a regrouping method to share said record to additional recordsets without decryption of said records.

5. The system of claim 1, wherein the system further comprises a secure and efficient record export method, the method comprises:

adding said token's secret to said Trusted Entity List in place of said entity key; and decrypt said recordset cipher by means of said token's secret to retrieve said recordset key.

6. The system of claim 1, wherein the system further comprises a Entity Key distribution method for creating a token by encryption of said Entity Key and said Record Key; and protecting said token with a user defined secret.

7. The system of claim 1, wherein the system further comprises an encryption keys creation method, the method comprises:

creating said record key with the use of a bitstream;
creating said recordset key with the use of a bitstream;
creating said Entity Key with the use of a bitstream; and
creating said Cipher with the use of both Entity Key and RecordSet Key.

8. The system of claim 1, wherein the system further comprises a decryption method, the method comprises:

obtaining an encrypted record;

obtaining an RecordSet Key associated with said encrypted record;

obtaining a RecordKey Cipher associated with said encrypted record;

decrypting said RecordKey Cipher with said RecordSet key to obtain a Record Key; and decrypting said encrypted record with said Record Key to obtain a Record.

9. The method of claim 8, wherein the method further comprises a Record modification method, the method comprises:

obtaining a modified Record;

encrypting said modified Record with said Record Key to obtain an replacement Record;

associating said replacement Record with said RecordKey Cipher; and associating said replacement Record with said RecordSet Key.

* * * * *